United States Patent
Sichau et al.

(10) Patent No.: US 8,378,511 B2
(45) Date of Patent: Feb. 19, 2013

(54) DEVICES AND METHODS FOR CONVERTING WAVE ENERGY INTO ELECTRICITY

(76) Inventors: Gary Steven Sichau, Quincy, MA (US); Zigmunt Michna, New Hartford, CT (US)

( * ) Notice: Subject to any disclaimer, the term of this patent is extended or adjusted under 35 U.S.C. 154(b) by 528 days.

(21) Appl. No.: 12/592,001

(22) Filed: Nov. 18, 2009

(65) Prior Publication Data

US 2010/0219633 A1   Sep. 2, 2010

Related U.S. Application Data

(60) Provisional application No. 61/199,564, filed on Nov. 18, 2008.

(51) Int. Cl.
*F03B 13/18* (2006.01)
(52) U.S. Cl. .......................... 290/42; 290/53
(58) Field of Classification Search ............... 290/42, 290/53
See application file for complete search history.

(56) References Cited

U.S. PATENT DOCUMENTS

| | | | | |
|---|---|---|---|---|
| 6,864,592 | B1* | 3/2005 | Kelly | 290/42 |
| 7,323,790 | B2* | 1/2008 | Taylor et al. | 290/42 |
| 7,385,301 | B2* | 6/2008 | Hirsch | 290/42 |
| 7,420,287 | B2* | 9/2008 | Smushkovich | 290/42 |
| 7,562,526 | B2* | 7/2009 | Lee | 60/507 |
| 7,786,609 | B2* | 8/2010 | Houser et al. | 290/53 |
| 2009/0251258 | A1* | 10/2009 | Rhinefrank et al. | 335/306 |
| 2010/0148504 | A1* | 6/2010 | Gerber | 290/42 |

* cited by examiner

*Primary Examiner* — Michael Zarroli

(57) ABSTRACT

A device that converts kinetic energy of waves of a body of water into electricity comprising a structure responsive to the kinetic energy, a rod extending through the structure; and an electromagnet positioned in the structure, and at least partially surrounding a portion of the rod. The electricity is generated in the rod when the electromagnet rises and falls along the rod in response to the kinetic energy. A magnetic field generated by the electromagnet has a varying strength that is modified according to the amount of kinetic energy to maximize the electricity generated.

13 Claims, 21 Drawing Sheets

DEVICES AND METHODS FOR CONVERTING WAVE ENERGY INTO ELECTRICITY

RELATED APPLICATION

This application claims the benefit of U.S. patent application No. 61/199,564 filed Nov. 18, 2008, the contents of which are incorporated by reference in their entirety.

BACKGROUND OF THE INVENTION

Wave energy buoys convert the energy of waves on a surface of a body of water, for example, from ocean surface waves, or waves formed in lakes, rivers, tidal estuaries, or other bodies of water, into electricity, which can be used to satisfy commercial and residential energy needs. Accordingly, wave energy buoys can, inter alia, reduce dependence on conventional fossil fuels. Conventional wave energy buoys use the rising and falling of the ocean waves to cause the buoy to move up and down, producing a resultant mechanical stroking within the buoy which is used to drive an electrical generator. Another conventional method of converting kinetic ocean wave energy into electricity is through the use of permanent magnets oscillating in relation to a conductive coil. As the magnets and coil oscillate relative to each other due to wave motion, electric current is created in the conductive coils. These conventional methods of converting kinetic ocean wave energy into electricity are generally inefficient since they only capture a small percentage of wave energy. This limitation is due in part to the device not being able to adjust to varying wave swells to maximize the generation of electricity. Thus, a conventional wave energy buoy cannot distinguish a wave having a greater height, wavelength, and/or speed, from a wave having a smaller height, wavelength, or speed. A conventional wave energy buoy with a fixed-strength magnet is prevented from maximizing the potential energy generated from waves with varying heights and force because where the magnet is too strong, the oscillation of the buoy is impeded reducing the amount of electric current generated in the coils. Further, where the fixed-strength magnet is too weak, the buoy will freely oscillate in relation to the coils, but the electric current generated in the coils will be less than the amount that could have been produced with a stronger magnetic field. Therefore, a conventional wave energy buoy using fixed-strength magnets of a constant strength magnetic field will not be able to optimize the potential electricity generated from each wave.

Wave energy buoys can be organized into a wave farm, such as a coastal buoy farm. However, it is difficult to manage and control a plurality of buoys organized into a wave farm so that electricity can be efficiently generated on a large scale. The inefficiencies described herein with regard to individual conventional buoys are magnified when a plurality of buoys are networked together in a buoy farm.

SUMMARY OF INVENTION

In accordance with an aspect of the inventive concepts, a device that convert kinetic energy of waves of a body of water into electricity comprising a floating structure that at least partially floats on the body of water and is responsive to the kinetic energy of the waves, a rod extending through the structure; and an electromagnet positioned in the structure, and at least partially surrounding a portion of the rod, wherein the electricity is generated in the rod when the electromagnet rises and falls along the rod in response to the kinetic energy, wherein a magnetic field generated by the electromagnet has a varying strength that is modified according to the amount of kinetic energy to maximize the electricity generated.

In an embodiment, the electricity is generated in the rod when the floating structure moves in a first direction from a first position of the rod to a second position of the rod that is higher than the first position.

In an embodiment, the electricity is generated in the rod when the floating structure moves in a second direction opposite the first direction from a third position of the rod to a fourth position of the rod that is lower than the third position.

In an embodiment, the device comprises at least one conductive coil assembly that is positioned in the rod, and wherein the electricity is generated in the at least one coil assembly in response to motion of the electromagnet relative to the at least one coil assembly.

In an embodiment, the at least one coil assembly comprises a hub, a plurality of spokes extending from the hub; at least one stem extending from each spoke; and at least one conductive wire arranged as a plurality of coils about the at least one stem.

In an embodiment, a plurality of conductive coil assemblies are positioned along a longitudinal axis that extends in direction of extension of the rod.

In an embodiment, the electromagnet generates the magnetic field by receiving a portion of the generated electricity.

In an embodiment, the floatable housing includes a power source that provides a current to the electromagnet to generate the magnetic field.

In an embodiment, a regulator controls the strength of the magnetic field of the electromagnet in response to the amount of kinetic energy of the waves.

In an embodiment, when a wave applies a first vertical force to the device, the regulator adjusts the strength of the magnetic field of the electromagnet to a first amount of strength.

In an embodiment, when the wave applies a second vertical force to the device that is weaker than the first vertical force, the regulator adjusts the strength of the magnetic field of the electromagnet to a second amount of strength that is less than the first amount of strength.

In an embodiment, when the surface wave applies a third vertical force to the device that is stronger than the first vertical force, the regulator adjusts the strength of the magnetic field of the electromagnet to a third amount of strength that is greater than the first amount of strength.

In an embodiment, the electricity generated by the device is transmitted to a power center.

In an embodiment, the rod is affixed to a ground surface.

In an embodiment, the rod is affixed to an arm platform.

In an embodiment, the device includes a strength gauge that measures a vertical force produced by the waves.

In accordance with another aspect, a wave measurement unit which determines a strength of a wave comprises a gauge float that at least partially floats on the body of water, the floating structure responsive to oscillatory motion of the waves; and a force gauge that calculates the strength of the wave required to move the force measurement unit in at least one of a vertical and a horizontal direction.

In an embodiment, wave measurement unit further comprises a rod extending through the gauge float; and an electromagnet positioned in the gauge float, and at least partially surrounding a portion of the rod, wherein the force gauge calculates the strength of the wave when the electromagnet rises and falls along the rod in response to motion of the waves.

In an embodiment, the wave measurement unit measures a velocity of the gauge float along the rod as the gauge float moves along at least a portion of the length of the rod in response to the oscillatory motion of the waves.

In accordance with another aspect, a system that converts kinetic energy to electricity comprises a plurality of wave energy devices coupled to a fixed surface, each device at least partially submerged in a body of water, each device comprising at least one electromagnet that produces electricity from kinetic energy of waves of the body of water; a power storage device that receives the electricity from the wave energy devices; at least one force-sensing device that determines a strength of waves proximal to the wave energy devices; and a controller that controls a strength of a magnetic field of the electromagnet in response to the determined strength of the kinetic energy of the waves.

In an embodiment, the fixed surface is part of a platform that is fixedly positioned above the body of water, and wherein the plurality of wave energy generating devices vertically extend from the platform.

In an embodiment, each wave energy device comprises: a floating structure that at least partially floats on the body of water, the floating structure responsive to the kinetic energy of the waves; and a rod extending through the floating structure, wherein the at least one electromagnet is positioned in the floating structure, and at least partially surrounding a portion of the rod, wherein the electricity is generated in the rod when the electromagnet rises and falls along the rod in response to motion of the waves, wherein a magnetic field generated by the electromagnet has a strength that is determined by the amount of kinetic energy of the waves.

In an embodiment, each wave energy device independently generates its own power.

In an embodiment, the at least one force-sensing device comprises: a gauge float that at least partially floats on the body of water, the floating structure responsive to oscillatory motion of the waves; and a force gauge that calculates the strength of the wave required to move the force measurement unit in at least one of a vertical and a horizontal direction.

In an embodiment, the plurality of wave energy devices are organized into sections of wave energy devices, each section including a force-sensing device and one controller.

In accordance with another aspect, a method of converting wave energy into electricity, comprises providing a floating structure that at least partially floats on the body of water, the floating structure responsive to the motion of the waves; extending a rod from the floating structure into the body of water; positioning an electromagnet in the floating structure about at least a portion of an outer surface of the rod; and controlling the electromagnet to produce a magnetic field having a strength that is determined by the amount of wave energy produced by the waves, wherein the electricity is generated in the rod when the electromagnet moves along at least a portion of the length of the rod in response to the motion of the waves.

In accordance with another aspect, a method of converting wave energy into electricity, comprises coupling a plurality of wave energy devices to a fixed surface; providing at least one electromagnet for each wave energy device, the at least one electromagnet producing electricity from the wave energy; providing a power storage device that receives the electricity from the wave energy devices; at least one force-sensing device that determines a strength of waves proximal to the wave energy devices; and controlling a strength of a magnetic field of the electromagnet in response to the determined strength of the kinetic energy of the waves.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention. In the drawings.

DETAILED DESCRIPTION OF EMBODIMENTS

Figure 1:
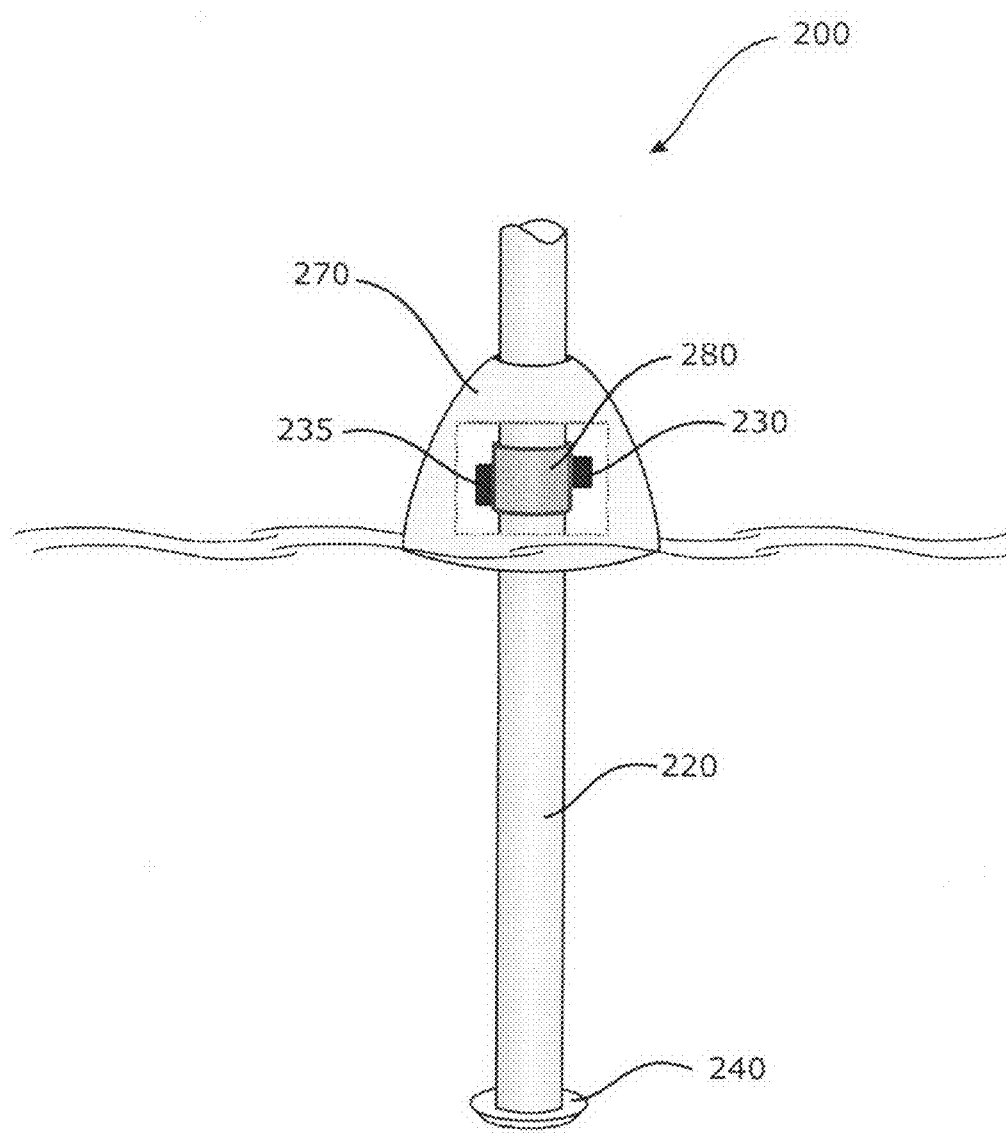
FIG. 1 is a perspective view of an embodiment of an electricity generation unit, in accordance with aspects of the present inventive concepts.

The accompanying drawings are described below, in which example embodiments in accordance with the present inventive concepts are shown. Specific structural and functional details disclosed herein are merely representative. This invention may be embodied in many alternate forms and should not be construed as limited to example embodiments set forth herein.

Accordingly, specific embodiments are shown by way of example in the drawings. It should be understood, however, that there is no intent to limit the invention to the particular forms disclosed, but on the contrary, the invention is to cover all modifications, equivalents, and alternatives falling within the spirit and scope of the claims.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present inventive concepts. As used herein, the term "and/or" includes any and all combinations of one or more of the associated listed items.

It will be understood that when an element is referred to as being "on," "connected to" "abutting," "coupled to," or "extending from" another element, it can be directly on, connected to, abutting, or coupled to the other element or intervening elements may be present. In contrast, when an element is referred to as being "directly on," "directly connected to," "directly abutting," "directly coupled to," or "directly extending from" another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

In order to overcome the limitations described above with regard to converting kinetic energy received from waves of a body of water into electricity, systems and methods in accordance with embodiments herein are provided that generate a maximum amount of current, regardless of the wave properties.

To achieve this, certain systems and methods in accordance with the embodiments include one or more electricity generation units that each comprises a floating structure, for example, a wave energy buoy or monitoring buoy, that houses either an electromagnet or one or more conductive wirings configured into coil assemblies, also referred to as windings, that generate electricity when movement occurs between the coil assemblies and the electromagnet. The magnetic properties of the electromagnet can be controlled by a regulator in response to wave energy. During operation, when a wave applies a force to the floating structure, the electromagnet moves along the length of a rod that houses the coil assemblies, from a lower portion of the rod to an upper portion of the rod during a peak state of the wave, and/or from an upper portion of the rod to a lower portion of the rod during a trough state of the wave. A regulator can receive information related to waves proximal to the buoy, and, in response to this information, can change the strength of the electromagnet's magnetic field, therefore increasing the amount of current generated in the coils. Thus, regardless of the direction of movement of the electromagnet relative to the rod, and regardless of the energy level of the wave applied to the floating structure, the electricity generation unit can generate a maximum amount of electricity.

FIG. 1 is a perspective view of an embodiment of an electricity generation unit 200 in accordance with aspects of the present inventive concepts.

In an embodiment, the electricity generation unit 200 comprises a floatable housing 270, at least one electromagnet 280, and a rod 220, also referred to as a shaft.

Figure 9A:
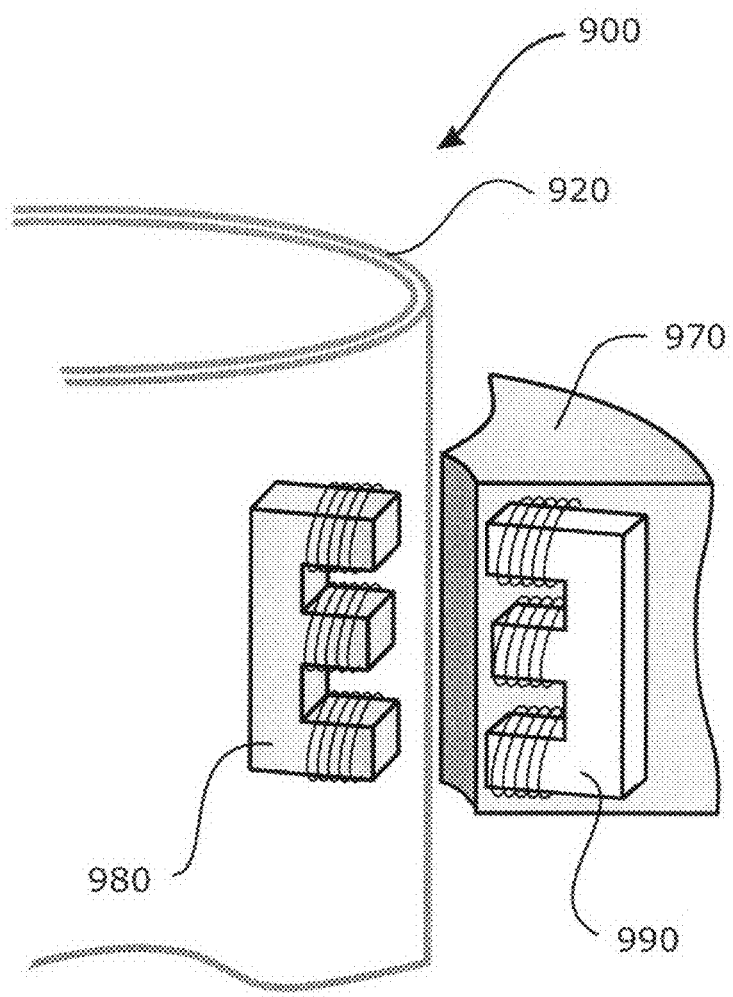
FIG. 9A is a perspective view of another embodiment of an electricity generation unit illustrating at least one electromagnet positioned inside a coil, in accordance with aspects of the present inventive concepts.
Figure 9B:
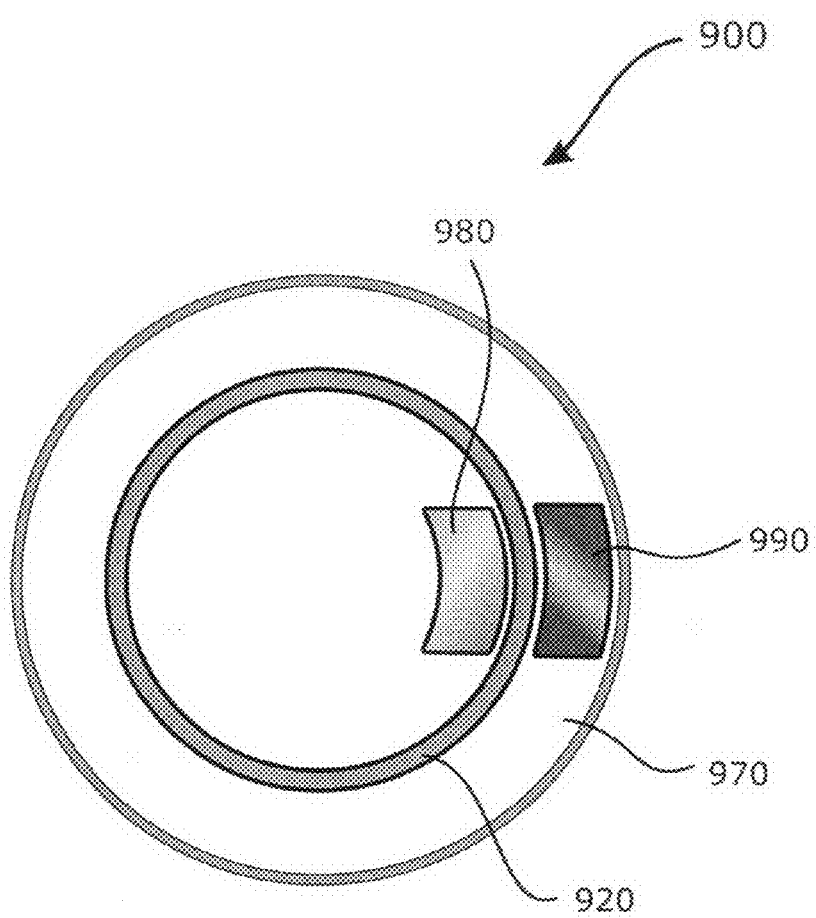
FIG. 9B is a top view of the electricity generation unit of FIG. 9A.

The floatable housing 270 comprises materials known to those of ordinary skill in the art, for example, fiberglass, foams, plastics, metals, metal alloys, or composites, that permit the floatable housing 270 to be at least partially buoyant and to be responsive to wave motion. In this manner, the floatable housing 270 can rise and fall along the direction of extension of the rod 220 with each wave that makes contact with the floatable housing 270. In particular, the floatable housing 270 moves up the rod 220 as a wave of the body of water approaches a peak state, and the floatable housing 270 drops down the rod 220 as the wave approaches a trough state. Accordingly, the electromagnet 280, which is attached to the floatable housing 270, also moves up and down the rod 220 in a direction of extension of the rod 220 in response to a force applied by the wave against the housing 270. Therefore, the wave motion causes the electromagnet 280 to move relative to the conductive elements of the rod 220, as described in detail below. Accordingly, electricity in the rod 220 is induced in response to the wave. In an embodiment, the amount of electricity produced depends on the force, height, speed, etc. of the wave, and/or the strength of the magnetic field of the electromagnet. In one embodiment, such motion can occur between the electromagnet 280 positioned in the floatable housing 270 relative to conductive elements positioned in the rod 220, as shown in FIG. 1. In another embodiment, such motion can occur between an electromagnet 980 positioned in a rod 920 and conductive elements 990 positioned in a floatable housing 970, as shown in FIGS. 9A and 9B.

The electromagnet 280 comprises at least one conductive core 282 and at least one winding 283. In an embodiment, the conductive core 282 can be arranged and configured to include a plurality of stems 281 that extend from the body of the core 282. In this manner, one or more windings 283 are positioned about a corresponding stem 281 of the core 282. In another embodiment, one winding can span or be positioned about multiple stems 281, for example, similar to that shown in FIG. 4, which illustrates a winding about multiple stems of a conductive coil. In another embodiment, the electromagnet 280 is constructed and arranged to have a configuration similar to a corresponding conductive coil 290, for example, each stem 281 and winding 283 having a similar configuration to a stem 293 and winding 294 of a conductive coil 290. In other embodiments, the electromagnet 280 can be constructed and arranged to have different configurations that permits a magnetic field to be produced that results in the generation of electrical current in the rod 220.

In an embodiment, the electromagnet 280 is positioned in the floatable housing 270, such that the floatable housing 270 at least partially encloses the electromagnet 280. In an embodiment, the electromagnet 280 is encased in the housing 270, wherein the housing 270 protects the electromagnet 280 from external elements, such as water. In another embodiment, the floatable housing 270 is hollow, and includes an opening formed through the housing 270 so that a portion of the rod 220 can be positioned in the opening of the housing 270. In this embodiment, the electromagnet can be positioned about the inner wall of the hollow housing 270 that defines the opening. As shown in FIG. 2B, a protective layer 260 can be positioned over the electromagnet 280, such that the electromagnet 280 is between the protective layer 260 and the housing 270, and is protected from external elements, for example, water, by the protective layer 260. The protective layer 260 comprises waterproof materials known to those of ordinary skill in the art, such as plastics, fiberglass, or composites. Regardless of the manner in which the electromagnet 280 is protected, that is, either by the protective layer 260 or the housing 270 in which the electromagnet 280 is encased, the ability of the electromagnet 280 to communicate with a coil assembly or other conductive elements to produce electricity is not compromised.

In an embodiment, the floatable housing 270 can be spherical, asymmetric, cylindrical, conical, bell-shaped, pear-shaped, disc-shaped, or doughnut-shaped. In embodiments, the geometry of the floatable housing 270; for example, size, shape, and the like, can be of a geometry known to those of ordinary skill in the art that permits the housing 270 to be responsive to wave motion, for example, to freely moves along the rod in response to wave motion. In an embodiment, the housing 270 moves up and down along at least a portion of the rod 220 with the rise and fall of waves. In another embodiment, when the rod extends in a horizontal direction of extension, for example, proximal to a shore, the housing 270 moves along the length of the rod in the horizontal direction in response to the ebbs and flows corresponding to wave motion.

Figure 6A:
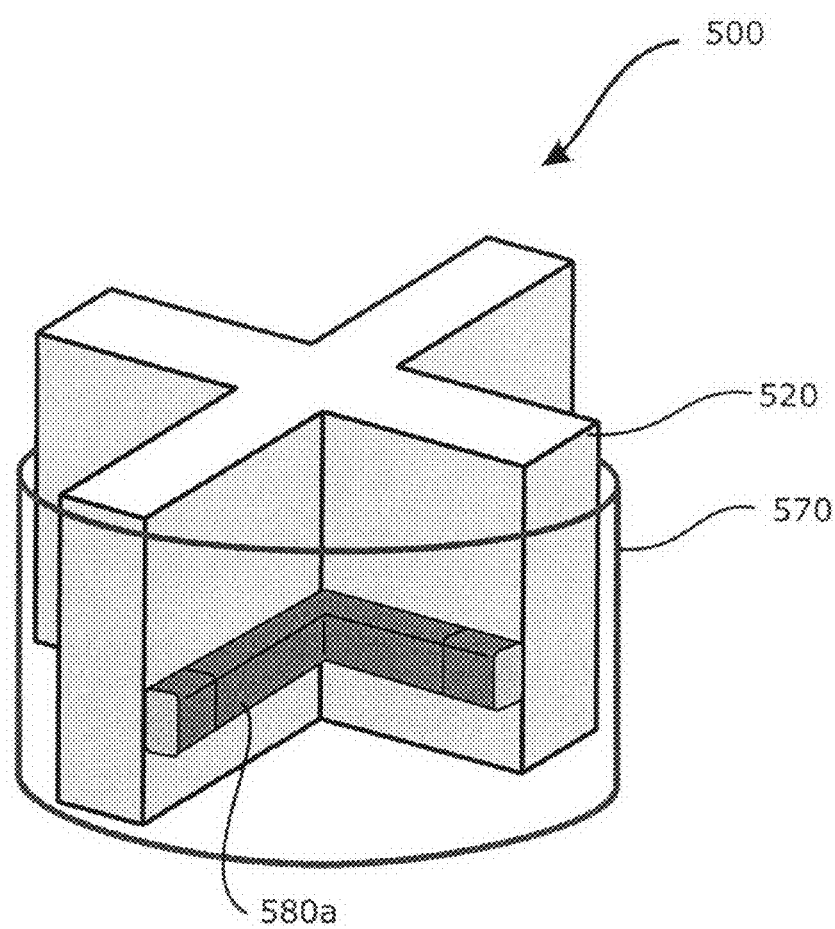
FIG. 6A is a perspective view of another embodiment of a rod of an electricity generation unit, in accordance with aspects of the present inventive concepts.
Figure 6B:
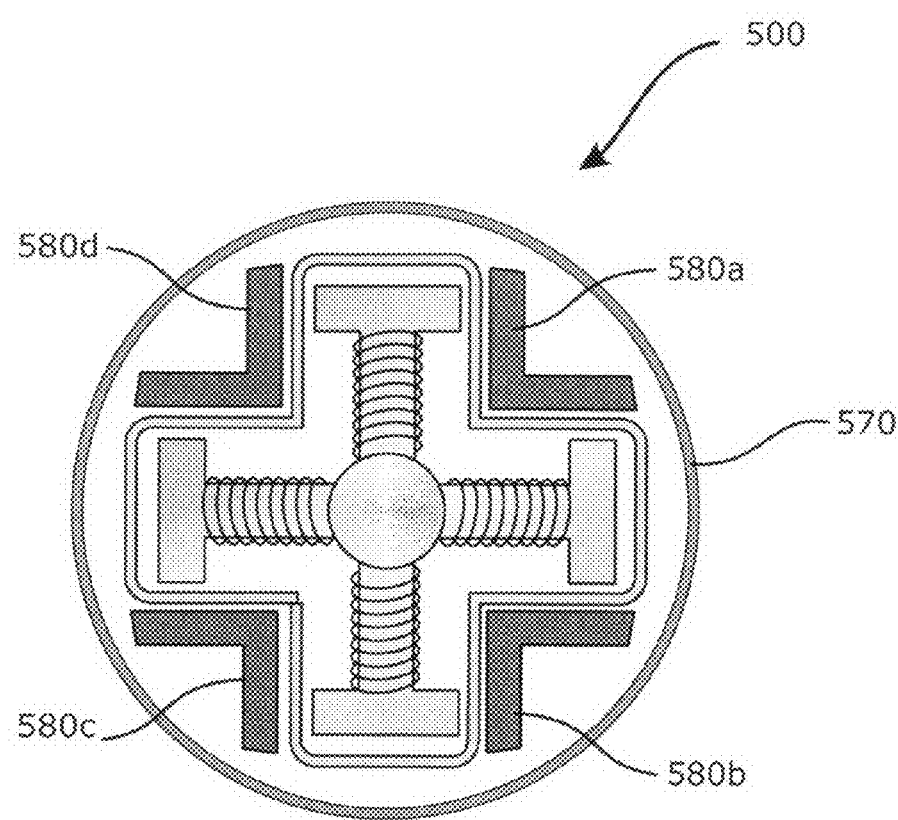
FIG. 6B is a cutaway top view of the rod of FIG. 6A.

In an embodiment, the rod 220 is cylindrical in shape. In an embodiment, the rod 220 is waterproof and/or airtight. In other embodiments, the rod 220, as shown in FIGS. 6A and 6B, the rod 220 can have a cross-sectional cross-shape. In other embodiments, the rod 220 can have cross-sectional flower-shapes or star-shapes. In other embodiments, the rod 220 can be hourglass-shaped, helical or spiral-shaped, or be of any shape that permits the electromagnet 280 to induce current in a conductive element such as a conductive coil, depending on the number of spokes in the coil assembly. In other embodiments, the rod 220 can have an oblong shape. In other embodiments, the rod 220 can be of a shape that permits one or more electromagnets 280 to be positioned about the rod 220, and move along the rod 220 in response to wave forces. In an embodiment, the rod 220 is at least partially coated with a lubricant that permits the housing 270 to reduce or eliminate friction between the housing 270 and the rod 220.

In an embodiment, the rod 220 has dimensions and geometries that permit conductive elements, such as coil assemblies or windings, to be positioned in the rod 220, for example, diameter or width of the rod 220. The dimensions and geometries of the rod 220 can determine the number of coil assemblies, and size of each coil assembly, which in turn, can permit a maximum, optimal number of coil assemblies to be positioned in the rod 220, thereby permitting more electricity to be produced.

In an embodiment, the rod 220 is formed of materials that are the same as or similar to those of the protective layer 260 described herein. In embodiments, the rod 220 is formed of materials that are different than, but provides benefits that are similar to, those offered by the protective layer 260, so as to permit a magnetic field produced by the electromagnet 280 positioned on a first side of the rod 220, for example, outside the rod 220, to induce electricity in conductive elements positioned on a second side of the rod 220, for example, inside the rod 220. The materials used to form the rod 220 also prevent the electromagnet 280 positioned about the rod 220 from physically contacting the conductive elements, but while permitting the formation of electricity in the conductive element 290.

Figure 13:
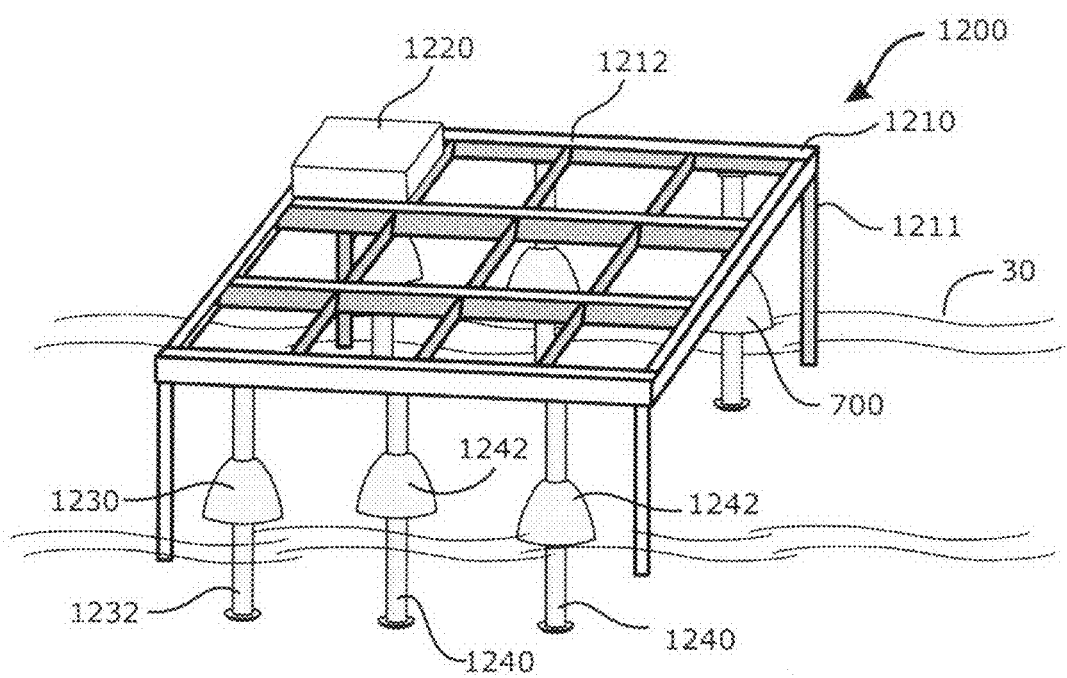
FIG. 13 is an illustrative view of an embodiment of an electricity producing system of FIG. 12, in accordance with aspects of the present inventive concepts.

In an embodiment, the rod 220 is coupled to a stationary platform such as an offshore rig or other arm platform positioned above the surface of the body of water 30. In this manner, the electromagnet 280 and the floatable housing 270 can move along the length of the rod 220. In an embodiment, the surface can be substantially stationary by being secured to the seabed or riverbed by at least one leg, which extends from the surface of the water so that the stationary platform is positioned above the surface of the water, for example, as shown in FIG. 13. In these embodiments, when one end of the rod 220 is coupled to the stationary surface of the platform, the other end of the rod 220 comprises a cap 240 that prevents the electromagnet 280 from sliding off the rod 220. In other embodiments, the bottom portion of the rod 220 is directly anchored to the floor of the body of water, for example, a seabed or riverbed, or moored to the floor of the body of water. In other embodiments, the floatable housing 270 or rod 220 is tethered to an anchor at the floor of the body of water by a rope, chain, etc. Regardless of the manner in which the rod 220 is directly or indirectly anchored to the floor of the body of water, the electromagnet 280 can move up and down along the rod 220 when waves apply a force against the housing 270.

The electromagnet 280, as powered by a power source, generates a magnetic field. In an embodiment, the electromagnet 280 is powered by a power supply 235. In an embodiment, the power supply 235 is positioned to be proximal to the housing 270, for example, coupled to the housing 270. In another embodiment, the power supply 235 is co-located with the electromagnet 280 in the rod 220. In an embodiment, the power supply 235 is positioned at a separate location from the electromagnet 280, for example, on an arm platform. In an embodiment, the electromagnet 280 is powered by a power maintenance unit, for example, described below. In an embodiment, at least a portion of the electricity current received by the electromagnet 280 is produced by the electricity generation unit 200, the electricity being stored in a power storage unit, for example, described below. In an embodiment, the electromagnet 280 is powered by at least one of the power supply 235, a power maintenance unit, and one or more other power sources during an initial operation of the electromagnet, wherein the electromagnet 280 is subsequently powered by at least a portion of the electricity produced by the electricity generation unit 200 during operation.

In the present inventive concepts, an electromagnet, such as electromagnet 280 described in FIG. 1, is preferable over conventional magnets, because electromagnets are generally lighter in weight than conventional permanent magnets, thereby permitting better responsiveness to wave motion. Further, in an embodiment, the electromagnet 280 can be controlled to generate varying strength magnetic fields, depending on wave strength, force, motion, and the like against the unit 200. Further, in other embodiments, the poles of the electromagnet 280 can be changed, or reversed, depending on the movement of the electromagnet 280 relative to the rod 220, for example, moving up or down along the peak or trough of the wave.

In an embodiment, the electromagnet 280 is powered by a power regulator 230. In particular, the amount of electricity supplied to the electromagnet 280 is determined by the power regulator 230. The power regulator 230 regulates the strength or force of the magnetic field generated by the electromagnet 280 in relation to the force of the upward and downward swells of a wave in order to maximize the electric current induced within the conductive elements.

In an embodiment, as shown in FIG. 1, the power regulator 230 is positioned in the floatable housing 270, and is co-located with or proximal to the electromagnet 280. In another embodiment, the regulator 230 is separate from the electricity generation unit 200, for example, positioned on an arm platform. Here, the power regulator 230 can adjust the strengths of one or more electromagnets 280 of one or more electricity generation units 200. In embodiments, the electricity generation unit 200 can communicate with external devices by way of global positioning satellite (GPS), data transmission electronics, cable, landline, Internet connection, satellite transmission, and the like.

In an embodiment, the regulator 230 includes a power regulation microchip (PRM) (not shown). The PRM uses data from a source buoy, or gauge, or regional data, or other external sources to adjust or control the strength of the electromagnet 280. In an embodiment, the regulator 230 receives data from a source buoy, for example, as described herein with regard to FIG. 11, to determine an amount of electricity to apply to the electromagnet and/or to change the polarity of the electromagnet. In other embodiments, the regulator 230 receives data from other sources. The regulator 230 is in communication with one or more of these sources, or with a source buoy, in a manner similar to those described above with regard to communication with the electricity generation unit 200, i.e., cable, satellite, etc.

As described above, the regulator 230 can adjust the strength of the magnetic field of the electromagnet 280 with regard to the movement of the electromagnet 280 relative to the rod 220. In an embodiment, when the electromagnet 280 is positioned at a top section of the rod 220, for example, when a wave is in a peak state, the regulator 230 provides a signal to the electromagnet to "weaken" the electromagnet 280, so that the electromagnet 280 moves down the rod 220 due to gravity, with weakened or lessened magnetic strength applied by the electromagnet 280 against the conductive elements in the rod 220. In another embodiment, the rod 220 extends in a substantially horizontal direction, wherein when the electromagnet 280 is positioned at a first position on the rod 220, for example, a leftmost position or a rightmost position, the regulator 230 provides a signal to the electromagnet 280 to either strengthen or weaken the electromagnet 280, depending on wave strength and/or wave motion to generate a maximum amount of electricity in the rod 220. Further, the regulator 230 changes the polarity of the electromagnet 280 so that a maximum amount of electricity can be generated in the rod 220 when the electromagnet 280 moves from one position in relation to the rod 220 to another position in relation to the rod 220. In other embodiments, the amount of electric current induced depends on parameters known to those of ordinary skill in the art, such as the magnetic field of the electromagnet 280, the velocity of the electromagnet 280 along the rod 220, the number of turns of conductive wiring forming the winding, spacings between turns of the winding, the diameter and/or length of each winding, the diameter of the conductive element about which the wiring is wrapped, etc.

When the electromagnet 280 is positioned at a bottom section of the rod, for example, when a wave is in a trough state, the PRM of the regulator 230 provides a signal to the electromagnet 280 to "strengthen" the electromagnet 280, so that when the electromagnet 280 is forced up the rod 220 by the force of the wave as it transitions from a trough state to a peak state, an optimum amount of magnetic strength will be applied to the electromagnet 280 against the conductive elements of the rod 220. As a vertical force is applied to the buoy 270 by a wave, the PRM adjusts the strength of the electromagnet 280 according to a mathematical algorithm so as to optimize the electrical current generated within the coil configuration 290, and vice versa for a stronger vertical wave force. In an embodiment, the algorithm determines a location of the electromagnet 280 along the rod 220 in response to the motion of the wave, for example, the crest or trough of the wave.

In an embodiment, the electricity generation unit 200 includes diodes and/or other electronic components arranged and configured as a bridge rectifier (see FIG. 3) that is coupled to the ends of each coil configuration 290 so that the generated AC current can be output as DC current to an external power storage unit or receiver, regardless of whether the electromagnet 280 moves in an up-down direction, or a down-up direction. Accordingly, the electricity generation unit 200 can output a maximum amount of electricity.

In another embodiment, the poles of the electromagnet 280 can be reversed depending on location of the electromagnet 280 relative to the rod 220, so that current can flow in the same direction regardless of whether the electromagnet 280 moves in an up-down direction or a down-up direction relative to wave motion.

Figure 10A:
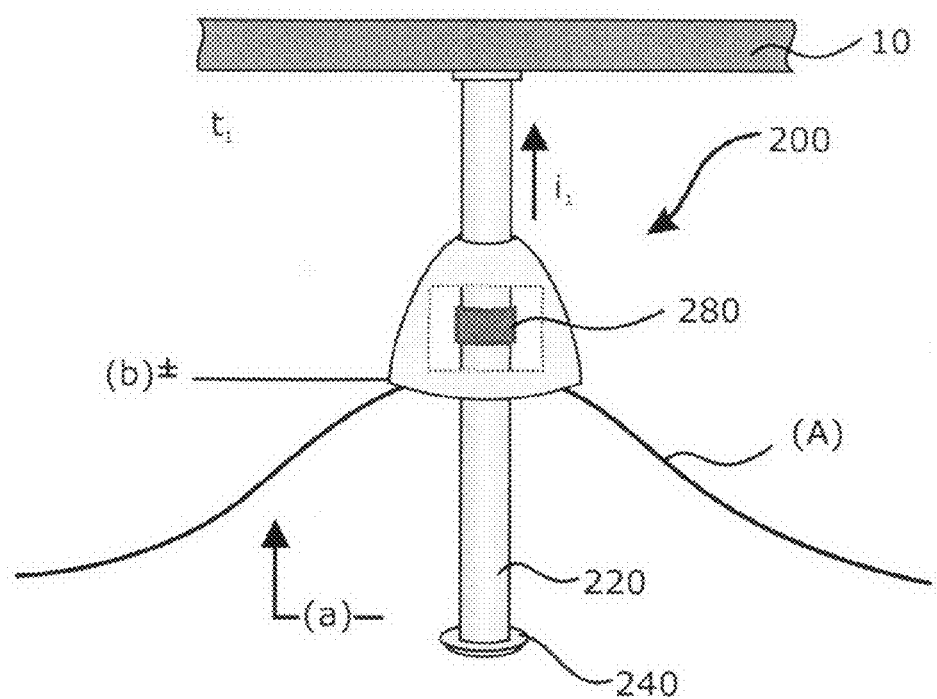
FIG. 10A is a view of an embodiment of an electricity generation unit illustrating an operation of the electricity generation unit, in accordance with aspects of the present inventive concepts.
Figure 10B:
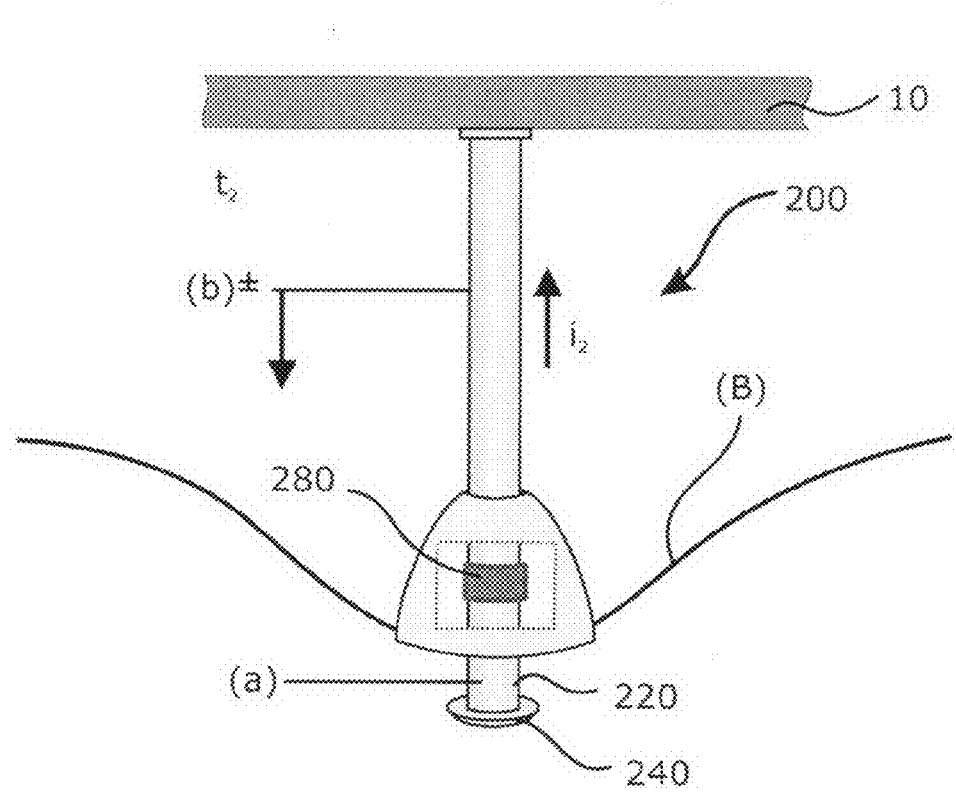
FIG. 10B is a view of an embodiment of the electricity generation unit of FIG. 10A illustrating another operation of the electricity generation unit, in accordance with aspects of the present inventive concepts.

These features are illustrated at FIGS. 10A and 10B. In particular, FIG. 10A is a view of an embodiment of the electricity generation unit 200 of FIG. 1 illustrating the generation of electricity when the electricity generation unit 200 moves in a first direction in response to a first wave state, and FIG. 10B is a view of an embodiment of the electricity generation unit 200 illustrating the creation of electricity when the device 200 moves in a second direction opposite the first direction shown in FIG. 10A in response to a second wave state.

As shown in FIGS. 10A and 10B, the electricity generation unit 200 can generate electricity so long as the electromagnet 280 moves along the rod 220, regardless of whether a wave is in a peak state (A), and moves the electromagnet 280 from a first position (a) along the rod 220 to a second position (b) along rod 220 that is higher than the first position (a), or whether a wave moves the electromagnet 280 from the second position (b) of the rod 220 to the first position (a) of the rod 220. In an embodiment, a power regulator (not shown) can change the polarity of the electromagnet 280 according to the direction of travel of the electromagnet 280. In another embodiment, a bridge rectifier, for example, rectifier 231 shown in FIG. 3, permits current i1 to be output when the electromagnet 280 moves from position (a) to (b) (see FIG. 10A), and current i2 to be output when the electromagnet moves from position (a) to (b) (see FIG. 10B).

Figure 2A:
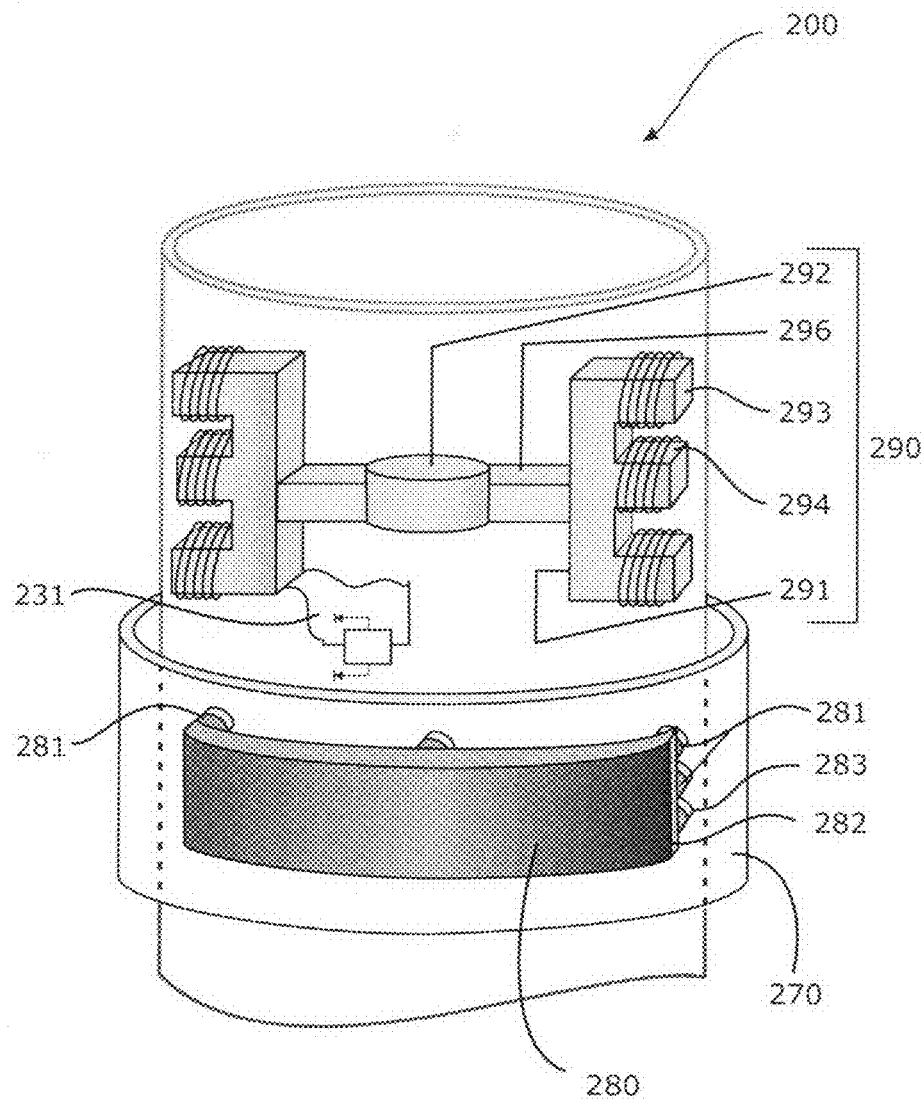
FIG. 2A is a cutaway perspective view of an embodiment of a rod of the electricity generation unit of FIG. 1, in accordance with aspects of the present inventive concepts.
Figure 2B:
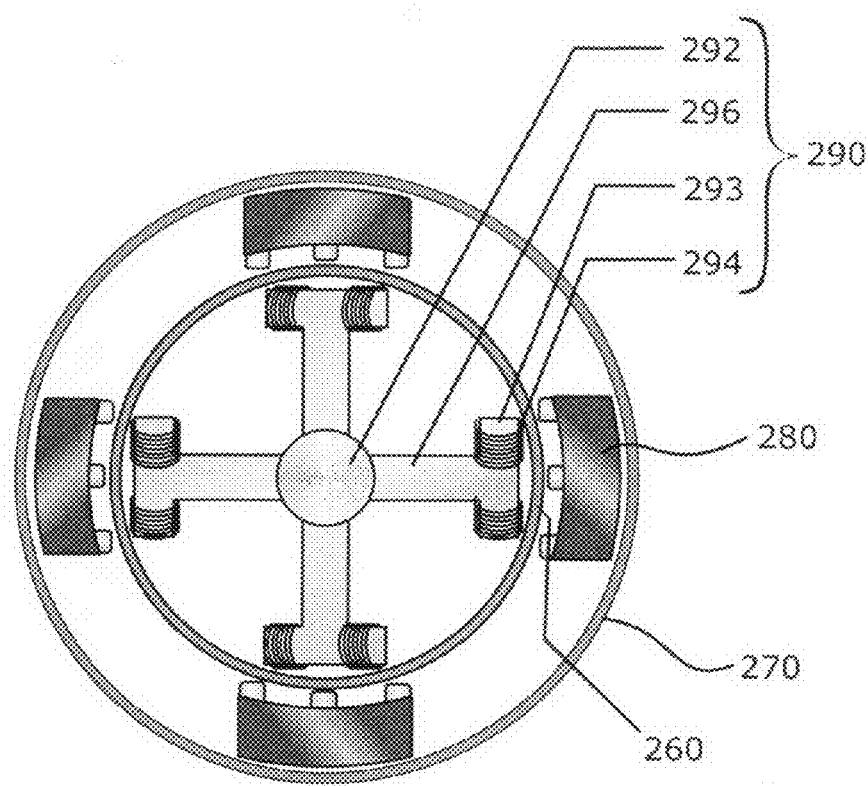
FIG. 2B is a cutaway top view of the rod of FIG. 2A.
Figure 3:
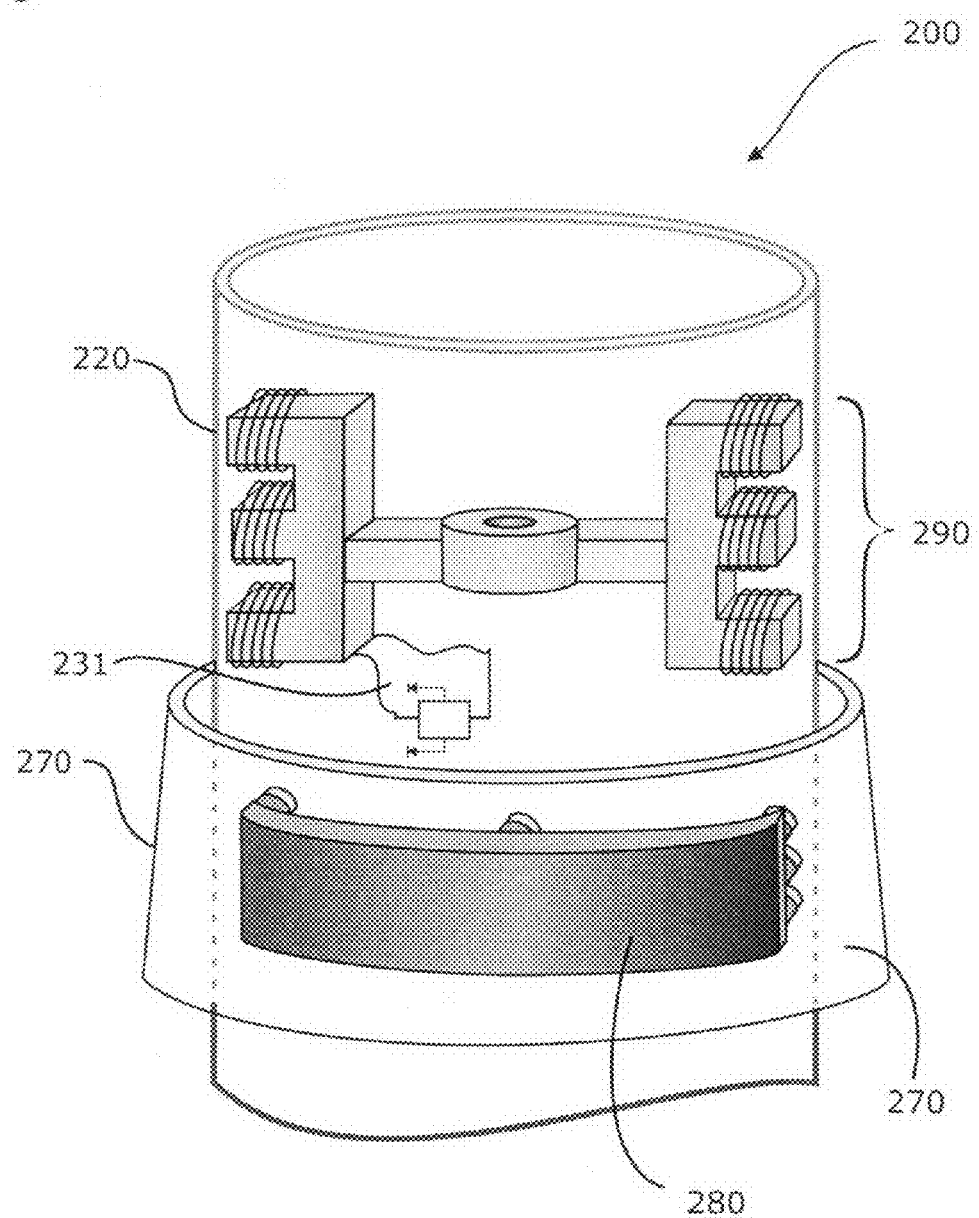
FIG. 3 is an expanded perspective view of the electricity generation unit of FIGS. 1, 2A, and 2B.

FIG. 2A is a cutaway perspective view of an embodiment of the rod 220 of the electricity generation unit 200 of FIG. 1, in accordance with aspects of the present inventive concepts. FIG. 2B is a cutaway top view of the rod 220 of FIG. 2A. FIG. 3 is an expanded perspective view of the electricity generation unit 200 of FIGS. 1, 2A, and 2B.

In an embodiment, at least one coil assembly 290 is positioned in the rod 220. In an embodiment, the coil assembly 290 comprises an insulative hub 292 and several spokes 296 extending from the hub 292. At the end of each spoke 296 are a plurality of stems 293 that are proximal to an outer surface of the rod 220. In an embodiment, the stems 293 are coupled to an inner wall of the rod 220 without spokes, hubs, and/or common connectors. The stems 293 are conductively coupled to each other via a common connector 291 that extends in a direction of extension of the rod 220, and is perpendicular to the corresponding spoke 296 to which the connector 291 is attached. In an embodiment, the spokes 296 can be of different lengths about the hub. In an embodiment, the stems 293 and/or connectors 291 can be of different sizes relative to each other.

Figure 4:
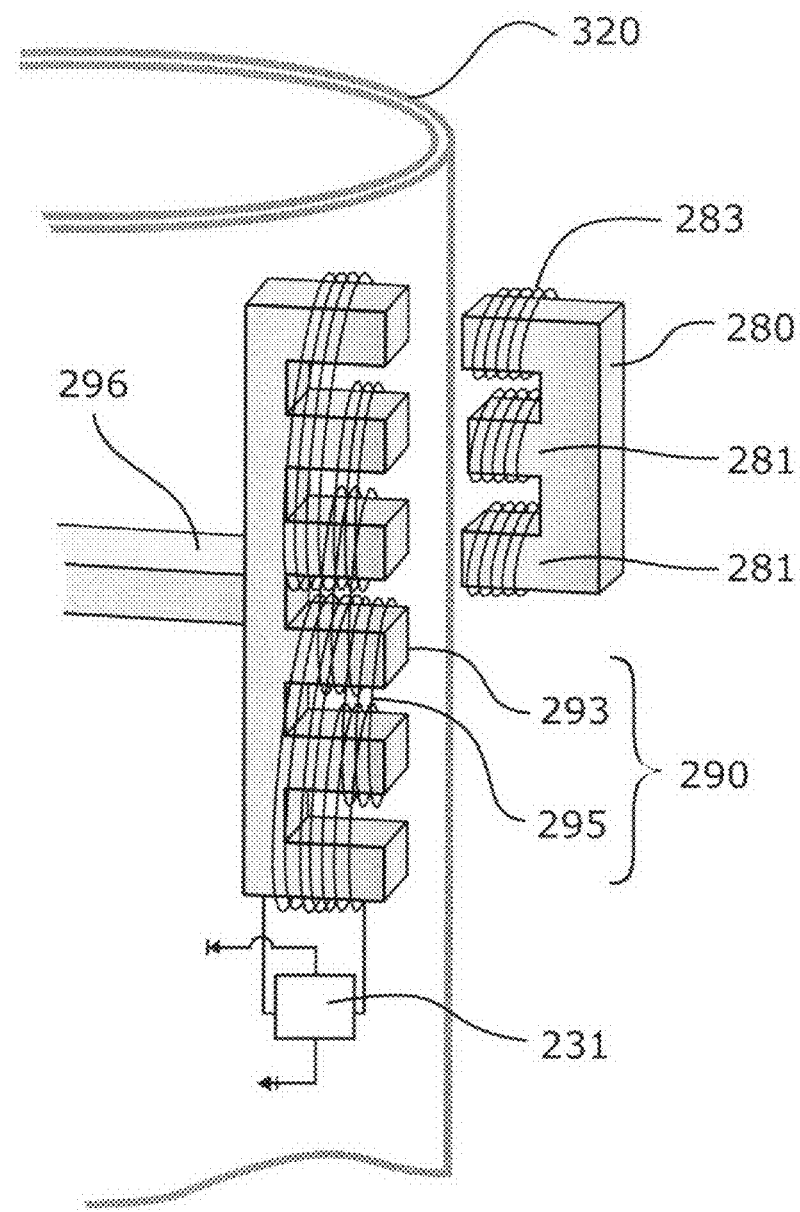
FIG. 4 is an expanded perspective view of an electricity generation unit including wirings that overlap each other, in accordance with aspects of the present inventive concepts.

In an embodiment, a conductive filament or wire 294 is positioned about each stem 293 in a manner that permits a current to be produced along the wire 294. In an embodiment, the wire 294 is wound about the stem 293 to form one or more coils about the stem 293. The positioning of the coils, thickness or gauge of wiring, diameter or width of stem, number of turns, and other relevant parameters known to those of ordinary skill in the art are such that a current can be induced in response to movement of the electromagnet 280 along the rod 220. In one embodiment, as shown in FIG. 3, each stem 293 has a wire 294 positioned about it. In another embodiment, as shown in FIG. 4, a wire 295 is wound about multiple stems 293, and multiple coil configurations are formed by wires 295 that overlap each other. In an embodiment, multiple wires 295 pertaining to different coils can be positioned on the same stem 293. The hub 292, spokes 296, and stems 293 are formed of materials that permit multiple currents to be formed in each coil assembly 290. The resulting electricity produced can be output from the coil configurations 290 to an external receiver, such as a battery, power source, etc. via conductive connectors.

The electromagnet 280 can be configured to include a plurality of stems 296 extending from a solid or hollow core 292. In an embodiment, the stems of the electromagnet 280 are similar in geometry to the stems 293 of the coil configuration 290. The electromagnet 280 can include a same number, or a lesser number, of stems 293 and corresponding windings 294 than those of the coil configurations 290. It is preferred that the electromagnet 280 includes stems 293 and corresponding 294 that are proximal to each coil configuration 290 when the electromagnet 280 moves along the rod 220.

Figure 5A:
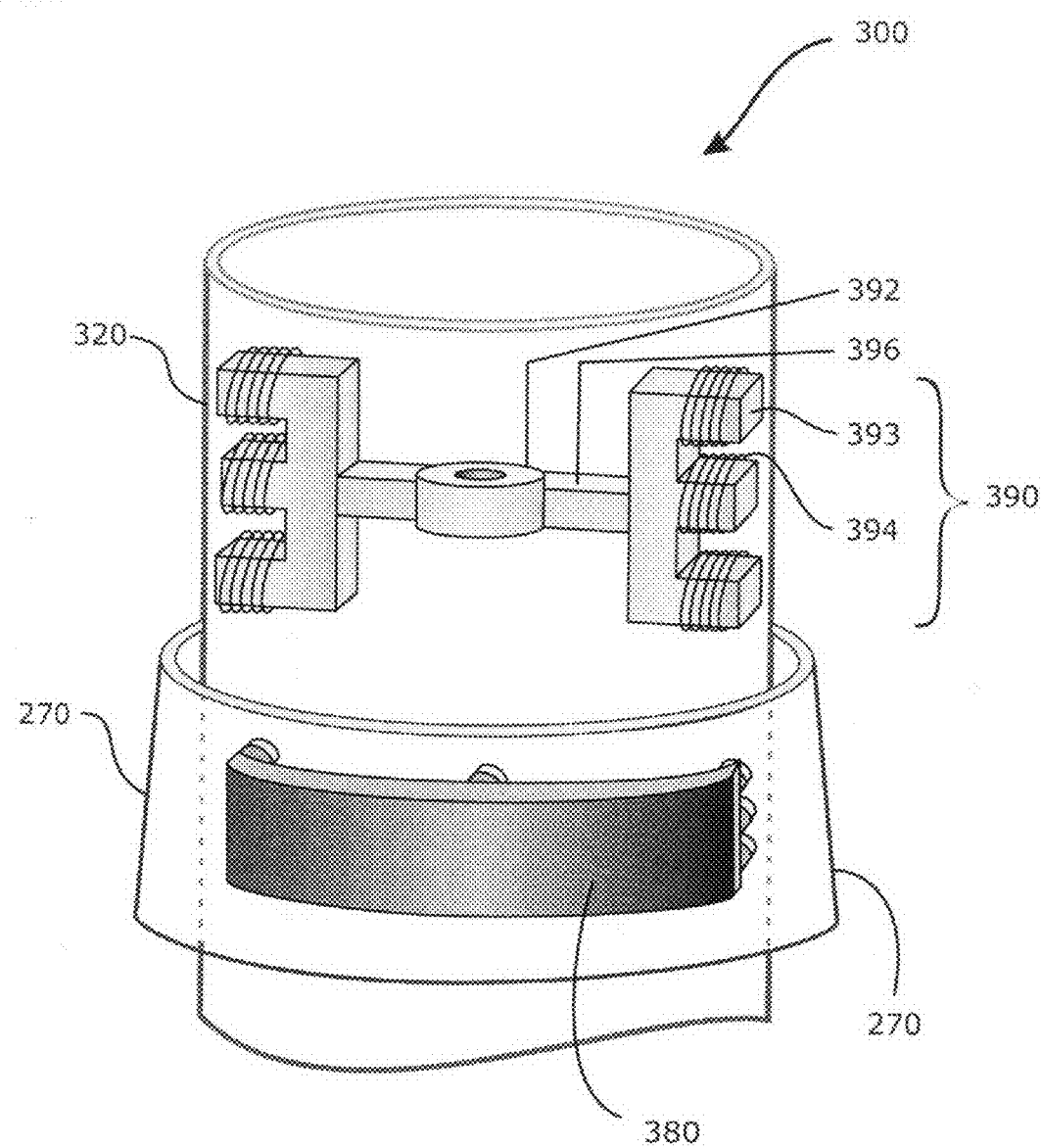
FIG. 5A is a cutaway perspective view of an embodiment of a rod of an electricity generation unit, in accordance with aspects of the present inventive concepts.
Figure 5B:
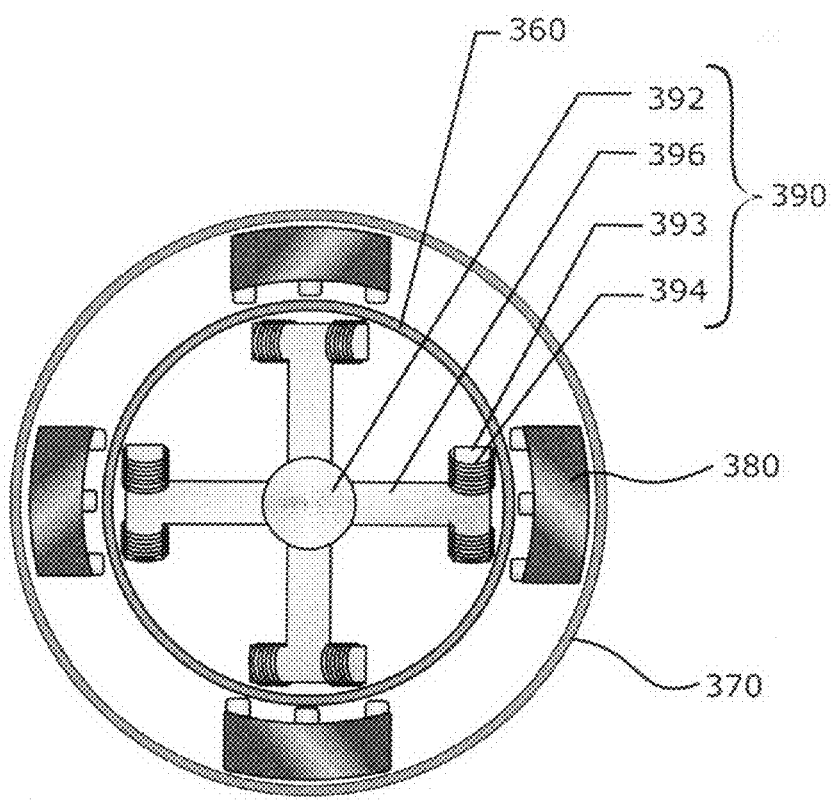
FIG. 5B is a cutaway top view of the rod of FIG. 5A.

FIG. 5A is a cutaway perspective view of an embodiment of a rod 220 of an electricity generation unit 300, in accordance with other aspects of the present inventive concepts. FIG. 5B is a cutaway top view of the rod 320 of FIG. 4. The electricity generation unit 300 is similar to the electricity generation unit 200 described above with regard to FIGS. 1-4, with noticeably different coil configurations 390.

In an embodiment, as shown in FIGS. 5A and 5B, at least one coil assembly 390 is positioned in the rod 220 and comprises a solid, hollow, or doughnut-shaped hub 392 and at least one spoke 396. In an embodiment, the at least one spoke 396 extends from the hub 392. At the end of each spoke 396 is a stem 393 that is proximal to an outer surface of the rod 220. In an embodiment, each stem 393 extends in a direction of extension of the rod 320, and is perpendicular to the corresponding spoke 396 to which the stem 393 is attached. In an embodiment, the spokes 396 can be of different lengths about the hub. In an embodiment, the stems 393 can be of different sizes relative to each other. In an embodiment, the at least one stem 393 is coupled to the rod 220, for example, to an inner wall of the rod 220, with no intervening spokes 396 or hubs 392.

In an embodiment, a filament or wire 394 is positioned about each stem 393 in a manner that permits a current to be produced along the wire 394. In an embodiment, the wire 394 is wound about the stem 393 to form a number of coils or turns. The positioning of the coils, thickness or gauge of wiring, diameter or width of stem, number of turns, and other relevant parameters known to those of ordinary skill in the art are such that a current can be induced in response to movement of the electromagnet 380 relative to the rod 320.

In an embodiment, the electricity generation unit 300 includes one or more electromagnets 380 positioned about the rod 220. In an embodiment, the electromagnet 380 can be similar to the electromagnet 280 described above with regard to FIGS. 1-4. In other embodiments, the electromagnet 380 can have a different configuration than that described above in FIGS. 1-4. In an embodiment, the electromagnet 380 can include a single doughnut-shaped core positioned about the rod 320. In another embodiment, the electromagnet 380 can be horseshoe shaped. In other embodiments, the electromagnet 380 can include one or more coils positioned about the core to be proximal to the coil configurations 390 when the electromagnet 380 moves along the rod 320 in response to a force, such as a wave force, or gravity.

FIG. 6A is a perspective view of another embodiment of a rod 520 of an electricity generation unit 500, in accordance with aspects of the present inventive concepts. FIG. 6B is a cutaway top view of the rod 500 of FIG. 6A. In the embodiments shown in FIGS. 6A and 6B, a plurality of electromagnets 580a-d are coupled to a single floatable housing 570. In other embodiments, electromagnets 580a-d can positioned in multiple floatable housings, for example, similar to the embodiment illustrated in FIGS. 15A and B, which are positioned about a rod. In the embodiment, the electromagnets 580 are L-shaped, and the rod 520 is cross-shaped. However, in other embodiments, the electromagnets 580 can be shaped in a manner that accommodates the corresponding shape of the rod 520, for example, in the shape of a pie-wedge. In an embodiment, each electromagnet 580a-d can independently move up and down along the length of the rod 520. In other embodiments, the electromagnets 580a-d move in tandem up and down along the length of the rod 520, in particular, when coupled to the same floatable housing 570.

Figure 14A:
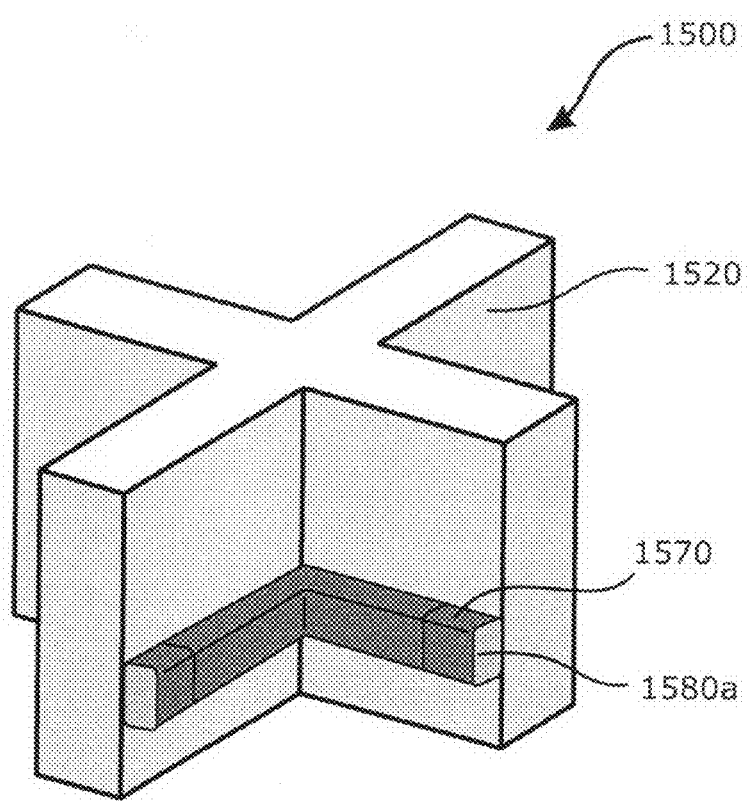
FIG. 14A is a perspective view of another embodiment of an electricity generation unit including multiple floatable housings and electromagnets, in accordance with aspects of the present inventive concepts.
Figure 14B:
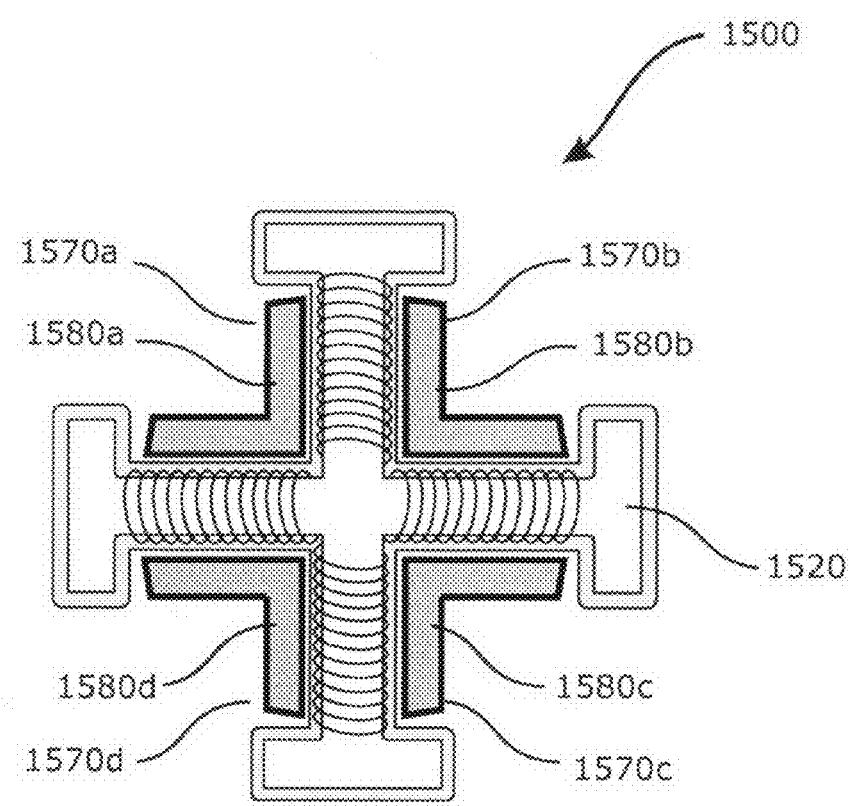
FIG. 14B is a cutaway top view of an embodiment of the electricity generation unit of FIG. 14A.

FIG. 14A is a perspective view of another embodiment of an electricity generation unit 1500 including multiple floatable housings 1570a-1570d and electromagnets 1580a-1580d, in accordance with aspects of the present inventive concepts. FIG. 14B is a cutaway top view of the electricity generation unit 1500 of FIG. 14A. In an embodiment, electricity generation unit 1500 comprises a rod 1520 that can be similar to and the same as those rods described herein. In an embodiment, the rod 1520 includes a waterproof covering that at least partially surrounds the rod 1520.

In an embodiment, the electromagnets 1580a-d can be positioned in the floatable housings 1570a-1570d, respectively, which are each positioned about at least a portion of the rod 1520. Each floatable housing 1570a-d can have positioned therein one or more electromagnets 1580a-1580d. In an embodiment, a waterproof protective layer can be positioned over the electromagnets 1580a-1580d, similar to protective layers described herein.

In an embodiment, the electromagnets 1580a-d can move along the length of the rod 1520 independently of one another. The rod 1520 can include one or more coil configurations, similar to or the same as coil configurations described herein.

Figure 15:
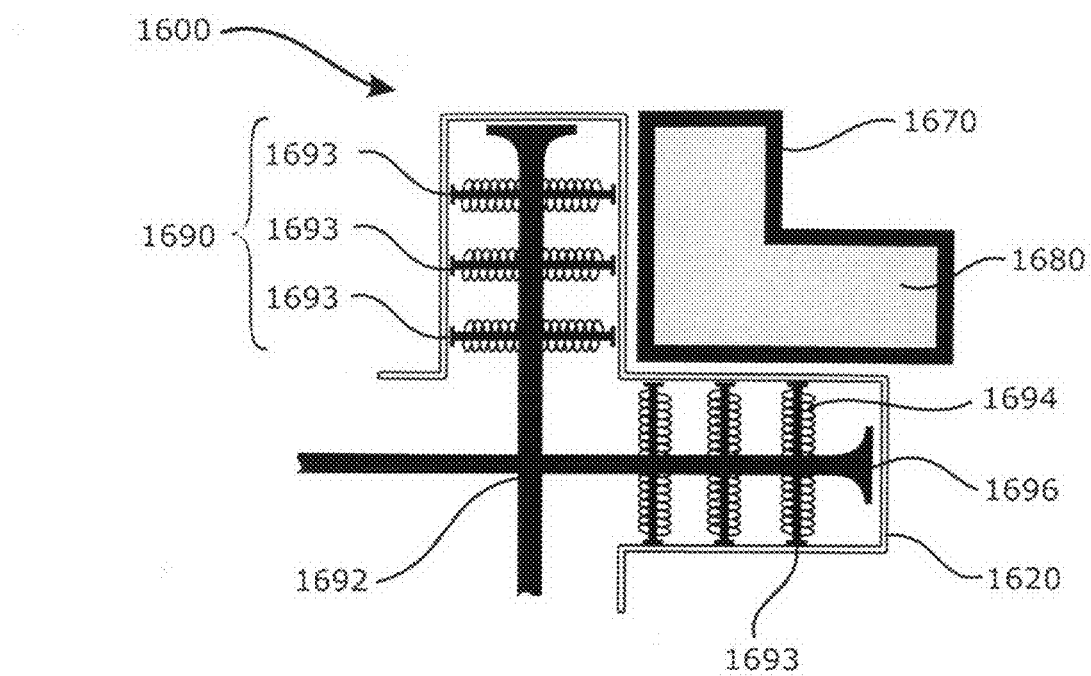
FIG. 15 is a cutaway top view of an embodiment of an electricity generation unit, in accordance with aspects of the present inventive concepts.

FIG. 15 is a cutaway top view of an embodiment of an electricity generation unit 1600, in accordance with aspects of the present inventive concepts.

In an embodiment, at least one coil assembly 1690 comprises one or more extenders 1696. In an embodiment, the extenders 1696 can extend from a solid, hollow, or doughnut-shaped hub 1692. In an embodiment, the extenders 1696 are directly coupled to each other. In an embodiment, one or more stems 1693 are coupled to each of the at least one extenders 1696. The stems 1693 are proximal to an outer surface of the rod 1620. In an embodiment, each stem 1693 extends in a direction of extension that is perpendicular or tangential to the direction of extension of the extender 1696 to which the stem 1693 is coupled. In an embodiment, the at least one stem 1693 can be of a different dimension than other stems 1693 coupled to the same extender 1696. In an embodiment, the at least one stem 1693 is coupled to the rod 1620, for example, to an inner wall of the rod 1620, with no extenders 1696 or hubs 1692.

In an embodiment, a filament or wire 1694 is positioned about each stem 1693 in a manner that permits a current to be produced along the wire 1694. In an embodiment, the wire 1694 is wound about the stem 1693 to form a number of coils or turns. The positioning of the coils, thickness or gauge of wiring, diameter or width of stem, number of turns, and other relevant parameters known to those of ordinary skill in the art are such that a current can be induced in response to movement of an electromagnet relative to the rod 1620.

In an embodiment, the electricity generation unit 1600 includes one or more electromagnets 1680 at least partially surrounded by a housing 1670 positioned about the rod 1620, similar to those electromagnets described herein.

Figure 7:
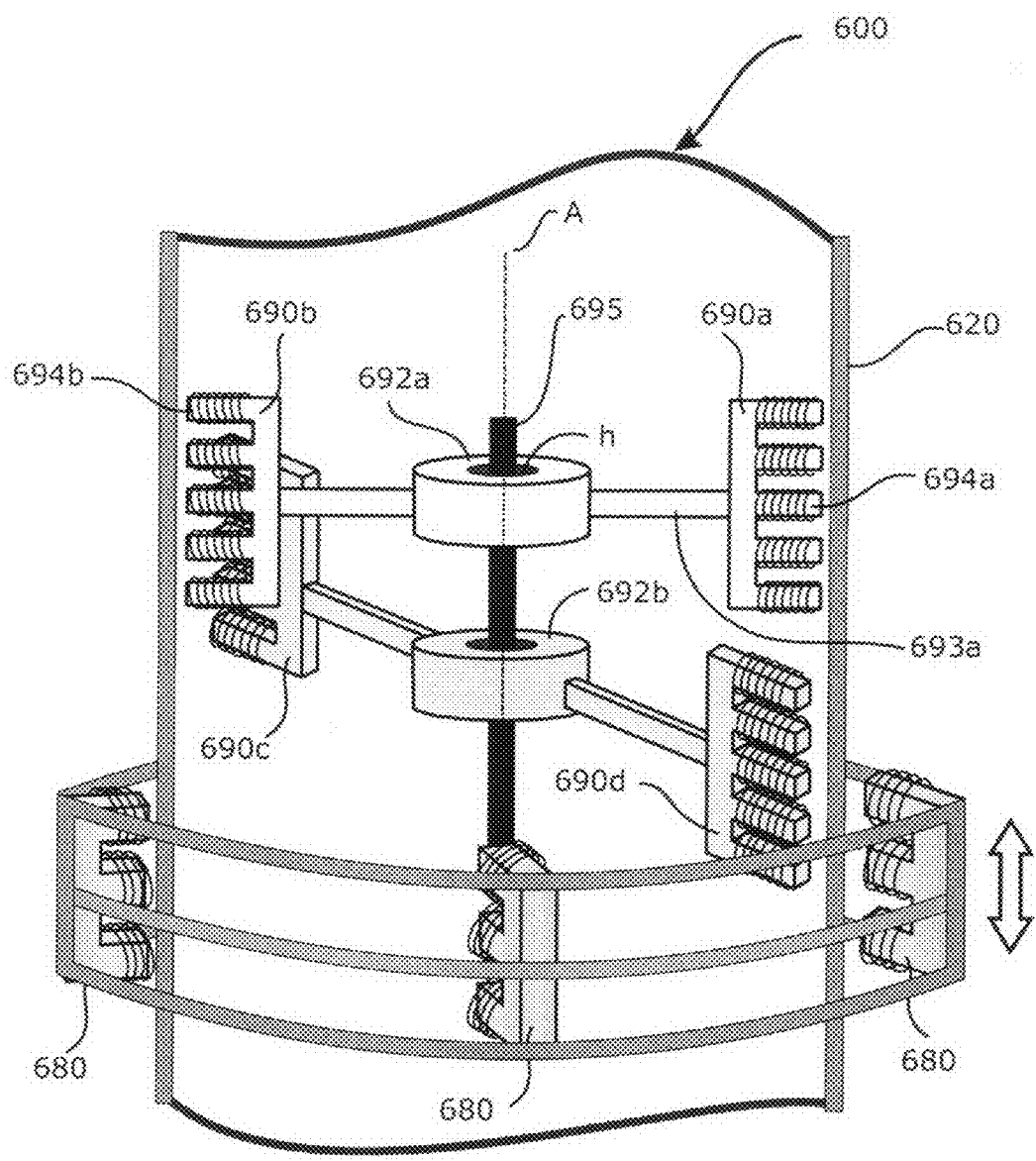
FIG. 7 is a cutaway perspective view of another embodiment of a rod of an electricity generation unit comprising a plurality of coil assemblies, in accordance with aspects of the present inventive concepts.

FIG. 7 is a cutaway perspective cutout view of another embodiment of a rod 620 of an electricity generation unit 600 comprising a plurality of coil assemblies 690a-d, in accordance with aspects of the present inventive concepts.

In an embodiment, each coil assembly 690a-690d includes a plurality of conductive coils 694a-d extending from a hub 692a and 692b, respectively, each of which can be of a different configuration, for example, different lengths, number of windings, thicknesses of wirings, length of spokes and/or stems, etc. Accordingly, a plurality of coil assemblies 690a-d can be configured and arranged in a rod 620 so that each coil assembly 690a-d independently generates electricity, thereby increasing the output of aggregate electricity from the coil assemblies.

In an embodiment, the hubs 692a, b can extend along the same axis A. In an embodiment, the hubs 692a, b can be disc-shaped. In an embodiment, each hub 692a, b can include an alignor (h) that is centered in the hub 292, wherein an optional alignment rod 695 can be inserted through the alignors (h) of the hubs 292 to ensure proper alignment of the coil assemblies 290 along the axis A. In an embodiment, the alignor (h) can be a hole or opening in the hubs. In other embodiments, the hubs 692a, b can be off-centered relative to the axis A and each other.

In FIG. 7, a plurality of first coil assemblies 690a, 690b extend from a first hub 692a that is positioned substantially along a longitudinal axis A by extenders or spokes 693a. A second hub 692b is positioned along the same longitudinal axis A as the first hub 692a. A plurality of second coil assemblies 690c, d extend from the second hub 692b and are positioned substantially about the longitudinal axis A in different positions relative to the longitudinal axis than the first coil assemblies 690a, b. For example, in embodiments that include spokes, from a top view of the rod 220, the first coil assemblies 690a, b are at 9 o'clock and 3 o'clock positions, respectively, relative to the longitudinal axis A and second coil assemblies 690c, d are at 11 O'clock and 5 O'clock positions, respectively, relative to the longitudinal axis A. In other embodiments, the coil assemblies 690a-d can have different configurations, for example, each hub can have three or more spokes and coil assemblies, and each rod can house one or more hubs, each with one or more coil assemblies. In other embodiments, the coil assemblies 690a-d comprise one or more stems about which one or more windings are positioned, with no hubs or spokes.

In the embodiments described herein, each conductive coil can independently generate electricity. The generated electricity is output along electrical connectors (not shown) that are coupled to the conductive wirings of the coil assemblies to an external power storage or transport unit, such as a shore-based power grid. In an embodiment, a single electrical connector can be coupled to each coil assembly and can transmit electricity regardless of the direction of motion of the floatable housing along the rod. In another embodiment, multiple electrical connectors are coupled to each coil assembly for transmitting electricity. In an embodiment, the connectors are constructed and arranged to travel through the spokes and hub of the coil assembly, and through a top portion of the rod to an outlet.

Figure 8:
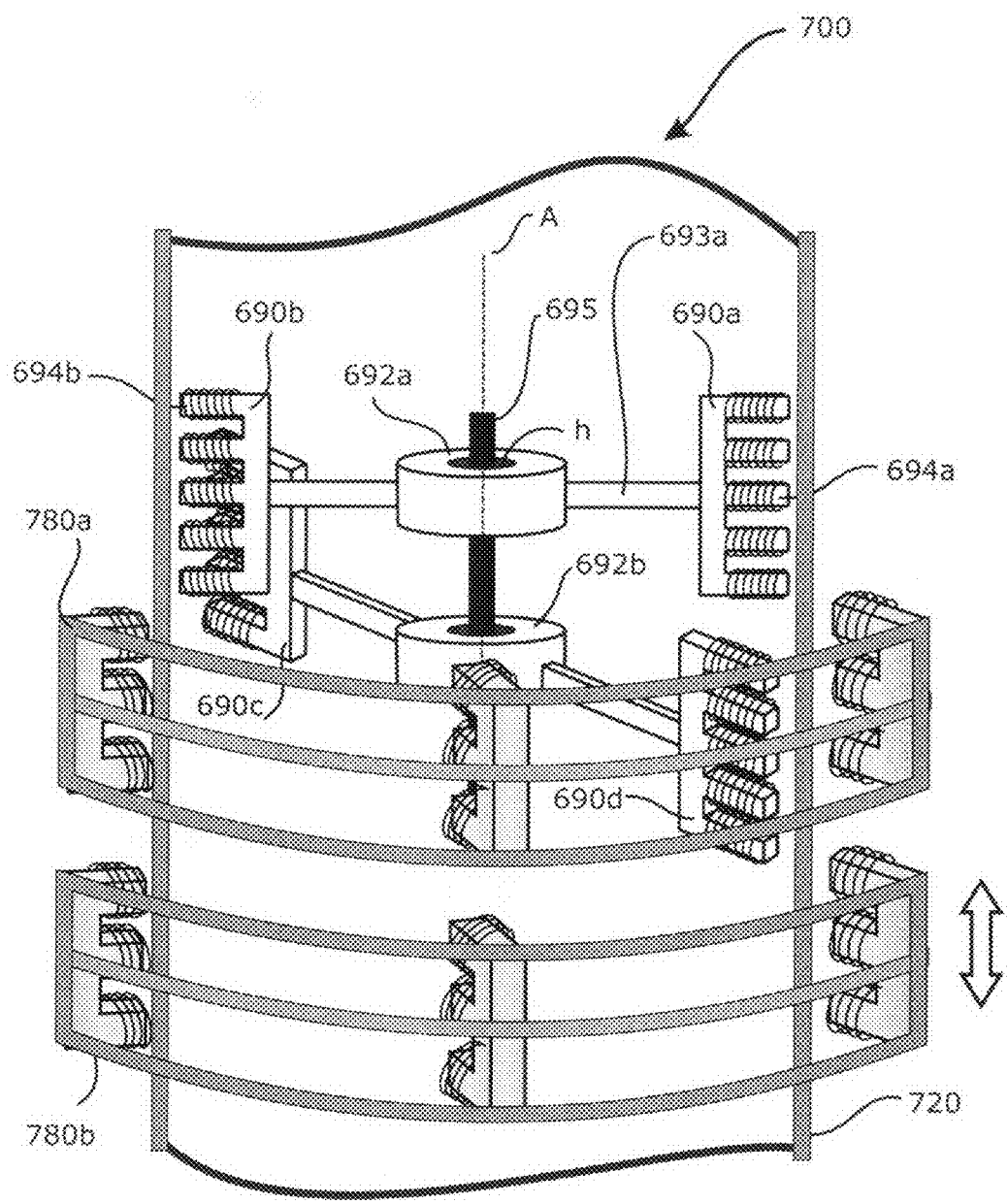
FIG. 8 is an expanded perspective view of an embodiment of an electricity generation unit illustrating at least two electromagnets positioned about a rod, in accordance with aspects of the present inventive concepts.

FIG. 8 is an expanded perspective view of an embodiment of an electricity generation unit 700 illustrating at least two electromagnets 780a, 780b positioned about a rod 720, in accordance with aspects of the present inventive concepts. The electricity generation unit 700 can be otherwise similar to those described herein with regard to at least FIGS. 1-7. Each electromagnet 780a, 780b can be positioned in a floatable housing (not shown), for example, similar to the floatable housing 270 shown in FIG. 1. In an embodiment, the rod 720 includes at least a same number of coil configurations as electromagnets. The additional electromagnets in accordance with the embodiments illustrated in FIG. 8 permit a greater amount electricity to be generated from the same unit 700 for each wave cycle than a single electromagnet. In an embodiment, one or more electromagnets can be positioned about a cross-sectional portion of the rod, for example, as shown in FIGS. 6A and 6B. In other embodiments, one or more electromagnets can be positioned along a direction of extension of the rod 720 as shown in FIG. 8. In other embodiments, a combination of one or more electromagnets can be positioned about a cross-sectional portion of the rod and one or more electromagnets can be positioned along a direction of extension of the rod.

FIG. 9A is a perspective view of another embodiment of a electricity generation unit 900 illustrating at least one electromagnet 980 positioned inside a rod 920, in accordance with aspects of the present inventive concepts. FIG. 9B is a top view of the electricity generation unit of FIG. 9A.

As shown in FIGS. 9A and 9B, a plurality of coil assemblies 990 can be positioned in a floatable housing 970, and one or more electromagnets 980 can be positioned in a rod 920. The coil assemblies 990 can be positioned in a similar manner as the electromagnet 980 described herein, for example, encased in the housing 970 or protected by a waterproof covering. In an embodiment, the floating housing 970 includes an opening into which the rod 920 is inserted, such that the floatable housing 970 can move freely along the length of the rod 920. In an embodiment, a coil assembly 990 can be formed about the perimeter of the opening in the housing 970, up to 360 degrees about the perimeter of the opening. In other embodiments, as shown in FIGS. 9A and 9B, multiple coil assemblies 990 can be positioned about the perimeter of the opening. In other embodiments, multiple coil assemblies 990 can be positioned along a length of the rod

920. The coil assemblies 990 can be configured and arranged in a similar manner as those described herein.

As shown in FIG. 9B, the coil assemblies 990 can at least partially surround the electromagnet 980. In this manner, waves from a body of water can apply a force against the floatable housing 970 in which is positioned the coil assembly 990, whereby the coil assembly 990 moves along the length of the rod 920 containing the electromagnet 980. As a result, electricity can be generated in the coil assembly 980.

Figure 11:
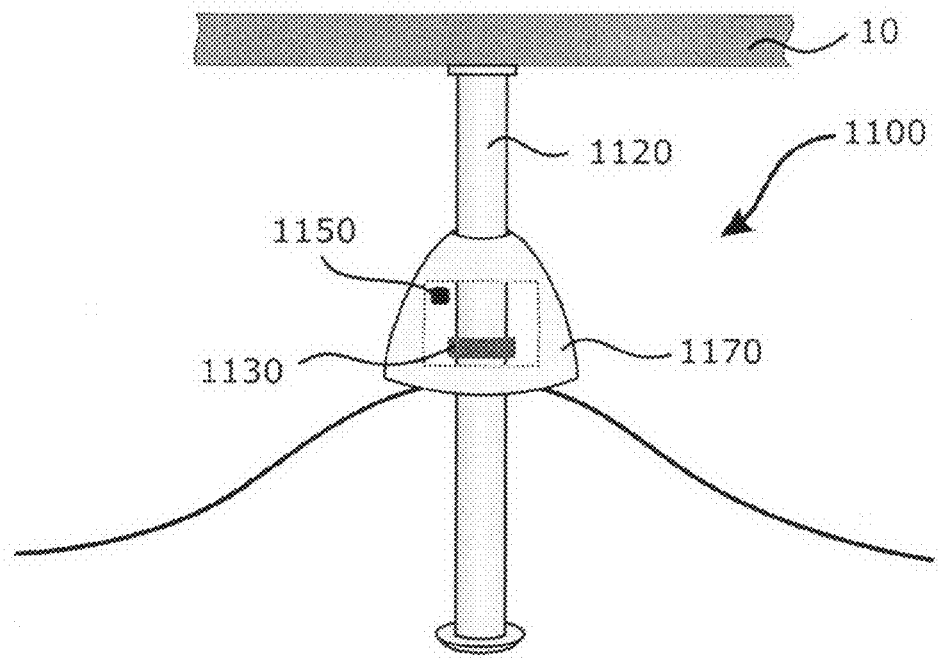
FIG. 11 is a perspective view of an embodiment of a wave measurement unit, in accordance with aspects of the present inventive concepts.

FIG. 11 is a perspective view of an embodiment of a wave measurement unit 1100, in accordance with aspects of the present inventive concepts.

The wave measurement unit 1100 can determine characteristics or features of a wave, such as a force or strength of the wave, a velocity of the wave, or other measurable wave parameters. This can include strength, velocity, force, dimensions, phase, cycle, or other measurable characteristics or features of one or more waves. Such measurements can be attained when the wave contacts the force management unit 1100.

The force management unit 1100 provides results of the determined measurable characteristics to a power regulator, for example, power regulator 230 described above with regard to FIG. 1, which, in an embodiment, is positioned on one or more electricity generation units, or in another embodiment, is positioned at a location external to the electricity generation units. The power regulator, in turn, can adjust the strength of an electromagnet in an electricity generation unit according to the strength of the wave. Accordingly, the electricity generation unit can generate electricity according to the strength of the wave. This feature is beneficial during periods when waves are small, i.e., long periods between wave troughs, and/or small wave heights, and do not produce significant force. This feature is also beneficial under heavy wind or tidal conditions where a substantial wave force is provided to electricity generation units, whereby the magnetic fields of the electromagnets of the electricity generation units can be increased in response to the powerful waves and thereby producing a greater amount of electricity.

In an embodiment, the force management unit 1100 can be positioned in a wave farm, and determine wave conditions that can be provided to one or more power regulators that can control a plurality of electricity generation units in the wave farm.

In an embodiment, the wave measurement unit 1100 comprises a gauge float 1170, a force gauge 1130, and a power supply 1150.

In embodiments, the gauge float 1170 is similar in shape, configuration, material composition, and other parameters to the floatable housings of the electricity generation units described herein. In embodiments, the suspension arm 1120 is similar in shape, configuration, material composition, and other parameters to the rods of the electricity generation units described herein, for example, suspended into the water from a fixed structure, such as an arm platform or grid. In an embodiment, the suspension arm 1120 includes one or more coil configurations (not shown), similar to those described herein. In an embodiment, the gauge float 1170 includes one or more electromagnets (not shown) which can provide a magnetic field that produces current in the coil configurations, in a manner similar to those described herein.

The force gauge 1130 measures characteristics of a wave against the gauge float 1170, for example, as described herein. The force gauge 1130 outputs information corresponding to a result of the determined measured wave characteristics to the power regulator, for example, regulator 230 described herein with regard to FIGS. 1-4.

In an embodiment, the force gauge 1130 can be positioned on an electricity generation unit, such as that shown in FIG. 1, whereby the electricity generation unit can generate electricity and measure one or more wave characteristics, which can determine a strength of the electromagnet of the electricity generation unit. In an embodiment, the force gauge 1130 can be positioned either in the floatable housing of a power management unit or on the arm platform or other unit that is external to the wave measurement unit 1100.

In an embodiment, the power supply 1150 provides operating power to the force gauge 1130 during an initial operation of the wave measurement unit 1100. The wave measurement unit 1100 can also include a storage unit (not shown), for example, a battery, that provides operating power to the force gauge 1130, wherein the battery is charged by the output of the coil configuration in the suspension arm 1120. In an embodiment, the power supply 1150 can be positioned at a location external to the wave measurement unit 1100.

Figure 12:
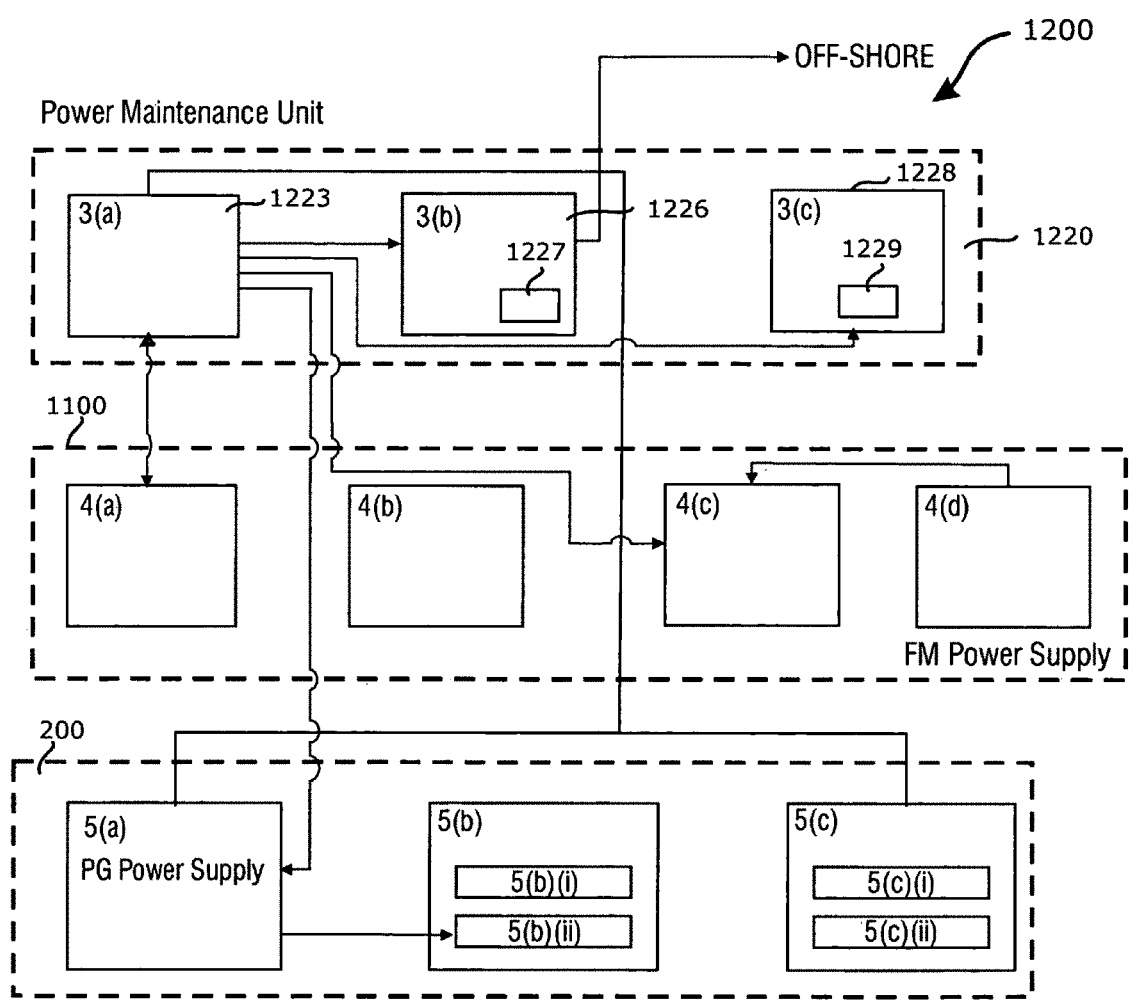
FIG. 12 is a schematic block diagram of an embodiment of a electricity producing system, in accordance with aspects of the present inventive concepts.

FIG. 12 is a schematic block diagram of an embodiment of an electricity producing system 1200, in accordance with aspects of the present inventive concepts. FIG. 13 is an illustrative view of an embodiment of the electricity producing system 1200 of FIG. 12, in accordance with aspects of the present inventive concepts.

The electricity producing system 1200 comprises at least one power maintenance unit 1220, at least one wave measurement unit 1230, and at least one electricity generation unit 1240. The power maintenance unit 1220 can be positioned on a platform 1210. The wave measurement unit 1230 and electricity generation unit 1240 can extend from the platform into a body of water 30.

The platform 1210 comprises at least one structure leg 1211 and a structure grid or base 1212. The at least one structure leg 1211 supports the structure grid 1212 above the surface of a body of water 30. In one embodiment, the structure legs 1211 can be positioned on buoyant pontoons that at least partially float on the surface of the water 30, and are anchored or tethered to a seabed. In another embodiment, the structure legs 1211 are driven into the ground at the bottom of the body of water 30.

In an embodiment, the structure grid 1212 includes an arm platform, which provides a fixed structure for a suspension arm 1232 about which the wave measurement unit 1230 is movably positioned and a rod 1242 about which a floatable housing of the electricity generation unit 1240 is movably positioned. The suspension arm 1232 and the rod 1242 can each be suspended from the arm platform into the body of water 30, for example, an ocean surface, river, waterfall, or lake. The arm platform can be a jack up platform, wave farm platform, and the like. Accordingly, a plurality of electricity generation units 1240 can be suspended from the structure grid 1212 to convert the kinetic energy produced by waves to electricity.

As shown in FIG. 12, the power maintenance unit 1220 comprises a power storage unit 1223, a power transfer unit 1226, and a power management unit 1228.

In an embodiment, the power storage unit 1223 stores electricity that is generated by each electricity generation unit 1240, and provides the stored electricity to a power grid or other shore-based power receiver that in turn provides the received power to homes and businesses. In an embodiment, the power storage unit 1223 provides operating power to at least one of the power management unit 1228, the wave measurement unit 1230, and the electricity generation unit 1240, for example, to one or more electromagnets of the wave measurement unit 1230 and the electricity generation unit 1240. Although the electromagnets can include their own source of power, for example, a battery or other power source, a portion of the electricity produced by the wave measurement unit 1230 and/or the electricity generation unit 1240 can be fed back to the wave measurement unit 1230 and/or the electricity generation unit 1240, or other components of the system requiring power in order to operate, whereby the received electricity can be used as operating power, or used to recharge batteries that may be used by these units. In this manner, the system 1200 can be self-powered.

In an embodiment, the power transfer unit 1226 filters electricity stored in the power storage unit 1223 to remove any electrical spikes or surges as the electricity is transported from the power producing platform 1200 to a shore-based power grid. In an embodiment, the power transfer unit 1226 comprises a capacitor to remove or reduce electrical spikes or surges from the generated electricity. In an embodiment, the power transfer unit 1226 comprises a solid-state chip to remove or reduce electrical spikes or surges. The solid-state chip can be a commercial off-the-shelf solid-state chip known to those of ordinary skill in the art.

In an embodiment, the power management unit 1228 measures available storage capacity in the power storage unit 1223. In an embodiment, the power management unit 1228 communicates with the power transfer unit 1226 to regulate the transfer of electricity from the electricity producing system 1200 to a shore-based power grid. In an embodiment, the power management unit 1228 communicates with the wave measurement unit 1230 to receive data pertaining to characteristics and features of waves against the wave measurement unit 1230. In an embodiment, the power management unit 1228 communicates with a power supply of each electricity generation unit 1240 to regulate power being supplied to an electromagnet of the electricity generation unit 1240.

In an embodiment, the electricity generation unit 1240 can be similar to any of those described with regard to FIGS. 1-10.

In an embodiment, each electricity generation unit 1240 comprises a regulator, similar to the regulators described above. In an embodiment, the regulator be collocated with an electricity generation unit 1240 and control the strength of the electromagnet in the electricity generation unit 1240, or can be external to the electricity generation units 1240, for example, positioned on the structure grid 1212, and manage and control one or more electromagnets of corresponding one or more electricity generation units 1240.

In an embodiment, the structure grid 1212 can be configured into sections or regions. Each section or region has positioned therein at least one electricity generation unit 1240 and a wave measurement unit 1230, which enables the system 1200 to receive information on wave strength from multiple locations in the grid, thereby providing more accurate data to the electricity generation units 1240. In other embodiments, a single wave measurement unit 1230 can be used in multiple regions. The wave measurement unit 1230 corresponding to a particular region or regions provides information pertaining to wave strength to the electricity generation units 1240 in the region.

The power maintenance unit 1220 receives the electricity produced by the electricity generation units 1240, and adjusts the electricity for application-specific uses, for example, high voltage/low current for long-distance transfer.

In an embodiment, a portion of the electricity produced by the electricity generation units 1240 is fed back by the power center to the electromagnets, for example, as described above. In an embodiment, a portion of the electricity produced by the electricity generation units 1240 is used to power the regulators. The power transfer unit 1226 transfers at least a portion of the electricity produced by the electricity generation units 1240 to a shore station.

Although the present inventive concepts have been described in connection with the embodiment of the present inventive concepts illustrated in the accompanying drawings, it is not limited thereto. It will be apparent to those skilled in the art that various substitution, modifications and changes may be thereto without departing from the scope and spirit of the invention.

What is claimed is:

1. A device that converts kinetic energy of waves of a body of water into electricity, the device comprising:
a floating structure that at least partially floats on the body of water, the floating structure responsive to the kinetic energy of the waves;
a rod extending through the floating structure; and
an electromagnet positioned in the floating structure, and at least partially surrounding a portion of the rod, wherein the electricity is generated in the rod when the electromagnet moves relative to the rod in response to motion of the waves, wherein a magnetic field generated by the electromagnet has a strength that is determined by the amount of kinetic energy of the waves, wherein the device comprises at least one conductive coil assembly that is positioned in the rod, and wherein the electricity is generated in the at least one coil assembly in response to motion of the electromagnet relative to the at least one coil assembly, and wherein the at least one coil assembly comprises:
a hub;
a plurality of spoke extending from the hub;
at least one stem extending from each spoke; and
at least one conductive wire arranged as a plurality of coils about the at least one stem.

2. The device of claim 1, wherein the electricity is generated in the rod when the floating structure moves in a first direction from a first position of the rod to a second position of the rod that is higher than the first position.

3. The device of claim 2, wherein the electricity is generated in the rod when the floating structure moves in a second direction opposite the first direction from a third position of the rod to a fourth position of the rod that is lower than the third position.

4. The device of claim 1, wherein the electromagnet generates the magnetic field by receiving a portion of the generated electricity.

5. The device of claim 1 further comprising a regulator that controls the strength of the magnetic field of the electromagnet in response to the amount of kinetic energy of the waves.

6. The device of claim 5, wherein when a wave applies a first vertical force to the device, the regulator adjusts the strength of the magnetic field of the electromagnet to a first amount of strength.

7. The device of claim 6, wherein when the wave applies a second vertical force to the device that is weaker than the first vertical force, the regulator adjusts the strength of the magnetic field of the electromagnet to a second amount of strength that is less than the first amount of strength.

8. The device of claim 7, wherein when the wave applies a third vertical force to the device that is stronger than the first vertical force, the regulator adjusts the strength of the magnetic field of the electromagnet to a third amount of strength that is greater than the first amount of strength.

9. The device of claim 1, wherein the electricity generated by the device is transmitted to a power center.

10. The device of claim 1, wherein the device includes a strength gauge that measures a vertical force produced by the waves.

11. A system that converts kinetic energy to electricity comprising:
- a plurality of wave energy devices coupled to a fixed surface, each device at least partially submerged in a body of water, each device comprising at least one electromagnet that produces electricity from kinetic energy of waves of the body of water;
- a power storage device that receives the electricity from the wave energy devices;
- at least one force-sensing device that determines a strength of waves proximal to the wave energy devices; and
- a controller that controls a strength of a magnetic field of the electromagnet in response to the determined strength of the kinetic energy of the waves, wherein the fixed surface is part of a platform that is fixedly positioned above the body of water, and wherein the plurality of wave energy generating devices vertically extend from the platform, wherein each wave energy device comprises:
  - a floating structure that at least partially floats on the body of water, the floating structure responsive to the kinetic energy of the waves; and
  - a rod extending through the floating structure, wherein the at least one electromagnet is positioned in the floating structure, and at least partially surrounding a portion of the rod, wherein the electricity is generated in the rod when the electromagnet rises and falls along the rod in response to motion of the waves, wherein a magnetic field generated by the electromagnet has a strength that is determined by the amount of kinetic energy of the waves, wherein each wave energy device independently generates its own power, wherein the at least one force-sensing device comprises:
    - a gauge float that at least partially floats on the body of water, the floating structure responsive to oscillatory motion of the waves; and
    - a force gauge that calculates the strength of the wave required to move the force measurement unit in at least one of a vertical and a horizontal direction.

12. The system of claim 11, wherein the plurality of wave energy devices are organized into sections of wave energy devices, each section including a force-sensing device and one controller.

13. A device that converts kinetic energy of waves of a body of water into electricity, the device comprising:
- a floating structure that at least partially floats on the body of water, the floating structure responsive to the kinetic energy of the waves;
- a rod extending through the floating structure;
- an electromagnet positioned in the floating structure, and at least partially surrounding a portion of the rod, wherein the electricity is generated in the rod when the electromagnet moves relative to the rod in response to motion of the waves, wherein a magnetic field generated by the electromagnet has a strength that is determined by the amount of kinetic energy of the waves; and
- a regulator that controls the strength of the magnetic field of the electromagnet in response to the amount of kinetic energy of the waves, wherein when a wave applies a first vertical force to the device, the regulator adjusts the strength of the magnetic field of the electromagnetic to a first amount of strength.

* * * * *